(12) United States Patent
Arimilli et al.

(10) Patent No.: US 7,904,590 B2
(45) Date of Patent: Mar. 8, 2011

(54) ROUTING INFORMATION THROUGH A DATA PROCESSING SYSTEM IMPLEMENTING A MULTI-TIERED FULL-GRAPH INTERCONNECT ARCHITECTURE

(75) Inventors: Lakshminarayana B. Arimilli, Austin, TX (US); Ravi K. Arimilli, Austin, TX (US); Ramakrishnan Rajamony, Austin, TX (US); William E. Speight, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 11/845,215

(22) Filed: Aug. 27, 2007

(65) Prior Publication Data

US 2009/0063814 A1    Mar. 5, 2009

(51) Int. Cl.
G06F 15/173 (2006.01)
(52) U.S. Cl. ........................................................ 709/238
(58) Field of Classification Search .................. 709/227, 709/238–234; 370/351; 712/10, 32
See application file for complete search history.

(56) References Cited

U.S. PATENT DOCUMENTS

| | | |
|---|---|---|
| 4,435,755 A | 3/1984 | Meritt |
| 4,679,189 A | 7/1987 | Olson et al. |
| 4,695,945 A | 9/1987 | Irwin |
| 4,893,306 A | 1/1990 | Chao et al. |
| 5,103,393 A | 4/1992 | Harris et al. |
| 5,166,927 A | 11/1992 | Lida et al. |
| 5,218,601 A | 6/1993 | Chujo et al. |
| 5,222,229 A | 6/1993 | Fukuda et al. |
| 5,327,365 A | 7/1994 | Fujisaki et al. |
| 5,331,642 A | 7/1994 | Valley et al. |
| 5,355,364 A | 10/1994 | Abali |
| 5,428,803 A | 6/1995 | Chen et al. |
| 5,481,673 A | 1/1996 | Michelson |
| 5,535,387 A | 7/1996 | Matsuoka et al. |
| 5,602,839 A | 2/1997 | Annapareddy et al. |
| 5,613,068 A | 3/1997 | Gregg et al. |

(Continued)

FOREIGN PATENT DOCUMENTS

EP    1351140 A1    10/2003

(Continued)

OTHER PUBLICATIONS

U.S. Appl. No. 11/845,207, filed Aug. 27, 2007, Arimilli et al.

(Continued)

*Primary Examiner* — Krisna Lim
(74) *Attorney, Agent, or Firm* — Francis Lammes; Stephen J. Walder, Jr.; Diana R. Gerhardt

(57) ABSTRACT

A mechanism is provided for routing information through the data processing system. Data is received at a source processor within a set of processors that is to be transmitted to a destination processor, where the data includes address information. A first determination is performed as to whether the destination processor is within a same processor book as the source processor based on the address information. A second determination is performed as to whether the destination processor is within a same supernode as the source processor based on the address information if the destination processor is not within the same processor book. A routing path is identified for the data based on results of the first determination, the second determination, and one or more routing table data structures. The data is then transmitted from the source processor along the identified routing path toward the destination processor.

20 Claims, 19 Drawing Sheets

U.S. PATENT DOCUMENTS

| | | | |
|---|---|---|---|
| 5,629,928 A | 5/1997 | Calvignac et al. |
| 5,701,416 A | 12/1997 | Thorson et al. |
| 5,710,935 A | 1/1998 | Barker et al. |
| 5,752,067 A | 5/1998 | Wilkinson et al. |
| 5,797,035 A | 8/1998 | Birrittella et al. |
| 5,845,060 A | 12/1998 | Vrba et al. |
| 6,044,077 A | 3/2000 | Luijten et al. |
| 6,078,587 A | 6/2000 | Lynch et al. |
| 6,147,999 A | 11/2000 | Honda et al. |
| 6,148,001 A | 11/2000 | Soirinsuo et al. |
| 6,230,279 B1 | 5/2001 | Dewa et al. |
| 6,266,701 B1 | 7/2001 | Sridhar et al. |
| 6,377,640 B2 | 4/2002 | Trans |
| 6,424,870 B1 | 7/2002 | Maeda et al. |
| 6,449,667 B1 | 9/2002 | Ganmukhi et al. |
| 6,512,740 B1 | 1/2003 | Baniewicz et al. |
| 6,522,630 B1 | 2/2003 | Ooms et al. |
| 6,535,926 B1 | 3/2003 | Esker |
| 6,542,467 B2 | 4/2003 | Umayabashi |
| 6,594,714 B1 | 7/2003 | Swanson et al. |
| 6,680,912 B1 | 1/2004 | Kalman et al. |
| 6,687,751 B1 | 2/2004 | Wils et al. |
| 6,694,471 B1 | 2/2004 | Sharp |
| 6,704,293 B1 | 3/2004 | Larsson et al. |
| 6,718,394 B2 | 4/2004 | Cain |
| 6,728,216 B1 | 4/2004 | Sterner |
| 6,744,775 B1 | 6/2004 | Beshai et al. |
| 6,775,230 B1 | 8/2004 | Watanabe et al. |
| 6,791,940 B1 | 9/2004 | Rajesh |
| 6,801,984 B2 | 10/2004 | Arimilli et al. |
| 6,816,899 B1 | 11/2004 | Meah |
| 6,857,026 B1 | 2/2005 | Cain |
| 6,865,160 B1 | 3/2005 | Bare |
| 6,931,486 B2 | 8/2005 | Cavallo et al. |
| 6,950,394 B1 * | 9/2005 | Chou et al. ............... 370/229 |
| 6,956,821 B2 | 10/2005 | Szviatovszki et al. |
| 6,956,858 B2 | 10/2005 | Hariguchi et al. |
| 6,957,274 B2 | 10/2005 | Trace et al. |
| 7,007,189 B2 | 2/2006 | Lee et al. |
| 7,054,269 B1 | 5/2006 | Luguern et al. |
| 7,093,154 B2 | 8/2006 | Bartfai et al. |
| 7,096,251 B2 | 8/2006 | Chiu et al. |
| 7,106,731 B1 | 9/2006 | Lin et al. |
| 7,120,120 B2 | 10/2006 | Guerin et al. |
| 7,123,619 B1 | 10/2006 | Lefebvre |
| 7,146,186 B1 | 12/2006 | Moon et al. |
| 7,155,525 B2 | 12/2006 | Glasco et al. |
| 7,159,137 B2 | 1/2007 | Nemawarkar et al. |
| 7,164,652 B2 | 1/2007 | Puppa et al. |
| 7,174,194 B2 | 2/2007 | Chauvel et al. |
| 7,184,440 B1 | 2/2007 | Sterne et al. |
| 7,200,741 B1 | 4/2007 | Mine |
| 7,215,644 B2 | 5/2007 | Wu et al. |
| 7,230,924 B2 | 6/2007 | Chiu et al. |
| 7,233,574 B2 | 6/2007 | Worfolk et al. |
| 7,239,641 B1 | 7/2007 | Banks et al. |
| 7,249,210 B2 | 7/2007 | Ganasan et al. |
| 7,308,558 B2 | 12/2007 | Arimilli et al. |
| 7,472,306 B2 | 12/2008 | Tsui et al. |
| 7,526,569 B2 | 4/2009 | Nishida et al. |
| 7,583,593 B2 | 9/2009 | Guichard et al. |
| 7,752,332 B2 * | 7/2010 | Jiang et al. ............... 709/238 |
| 2002/0012320 A1 | 1/2002 | Ogier et al. |
| 2002/0027885 A1 | 3/2002 | Ben-Ami |
| 2002/0046324 A1 | 4/2002 | Barroso et al. |
| 2002/0049859 A1 | 4/2002 | Bruckert et al. |
| 2002/0064130 A1 | 5/2002 | Siu et al. |
| 2002/0080798 A1 | 6/2002 | Hariguchi et al. |
| 2002/0095562 A1 | 7/2002 | Nakanishi et al. |
| 2002/0186665 A1 | 12/2002 | Chaffee et al. |
| 2003/0086415 A1 | 5/2003 | Bernhard et al. |
| 2003/0174648 A1 | 9/2003 | Wang et al. |
| 2003/0182614 A1 | 9/2003 | Schroeder |
| 2003/0195983 A1 | 10/2003 | Krause et al. |
| 2003/0233388 A1 | 12/2003 | Glasco et al. |
| 2004/0059443 A1 | 3/2004 | Sharangpani |
| 2004/0073831 A1 | 4/2004 | Yanai et al. |
| 2004/0151170 A1 | 8/2004 | Gulati et al. |
| 2004/0190517 A1 | 9/2004 | Gupta et al. |
| 2004/0193612 A1 | 9/2004 | Chang |
| 2004/0193693 A1 | 9/2004 | Gangwal et al. |
| 2004/0215901 A1 | 10/2004 | Gaither |
| 2004/0236891 A1 | 11/2004 | Arimilli et al. |
| 2004/0268044 A1 | 12/2004 | Heller, Jr. et al. |
| 2005/0002334 A1 | 1/2005 | Chao et al. |
| 2005/0044301 A1 | 2/2005 | Vasilevsky et al. |
| 2005/0073962 A1 | 4/2005 | Zabele et al. |
| 2005/0100035 A1 | 5/2005 | Chiou et al. |
| 2005/0108444 A1 | 5/2005 | Flauaus et al. |
| 2005/0122955 A1 | 6/2005 | Lin et al. |
| 2006/0031659 A1 | 2/2006 | Chow |
| 2006/0047849 A1 | 3/2006 | Mukherjee |
| 2006/0050690 A1 | 3/2006 | Epps et al. |
| 2006/0059407 A1 | 3/2006 | Wang et al. |
| 2006/0080417 A1 | 4/2006 | Boutboul et al. |
| 2006/0080569 A1 | 4/2006 | Sciacca |
| 2006/0104303 A1 | 5/2006 | Makineni et al. |
| 2006/0133282 A1 | 6/2006 | Ramasamy |
| 2006/0146715 A1 | 7/2006 | Supalov |
| 2006/0152593 A1 | 7/2006 | Bone et al. |
| 2006/0168317 A1 | 7/2006 | Charzinski et al. |
| 2006/0200278 A1 | 9/2006 | Feintuch |
| 2006/0223524 A1 | 10/2006 | Ginzburg |
| 2007/0014276 A1 | 1/2007 | Bettink et al. |
| 2007/0035033 A1 | 2/2007 | Ozguz et al. |
| 2007/0038987 A1 | 2/2007 | Ohara et al. |
| 2007/0041326 A1 | 2/2007 | Babiarz et al. |
| 2007/0047453 A1 | 3/2007 | Bender et al. |
| 2007/0053300 A1 | 3/2007 | Zhu et al. |
| 2007/0061811 A1 | 3/2007 | Rumelhart et al. |
| 2007/0064737 A1 | 3/2007 | Williams |
| 2007/0081516 A1 | 4/2007 | Arimilli et al. |
| 2007/0088933 A1 | 4/2007 | Kelley |
| 2007/0097952 A1 | 5/2007 | Truschin et al. |
| 2007/0110079 A1 | 5/2007 | Schollmeier et al. |
| 2007/0121618 A1 | 5/2007 | Hirano |
| 2007/0127386 A1 | 6/2007 | Joshi et al. |
| 2007/0165524 A1 | 7/2007 | Mascolo |
| 2007/0183421 A1 | 8/2007 | Terrell et al. |
| 2007/0192650 A1 | 8/2007 | Shiota |
| 2007/0226686 A1 | 9/2007 | Beardslee et al. |
| 2008/0043742 A1 | 2/2008 | Pong et al. |
| 2008/0082933 A1 | 4/2008 | Howard et al. |
| 2009/0006808 A1 | 1/2009 | Blumrich et al. |
| 2009/0063443 A1 | 3/2009 | Arimilli et al. |
| 2009/0063444 A1 | 3/2009 | Arimilli et al. |
| 2009/0063445 A1 | 3/2009 | Arimilli et al. |
| 2009/0063728 A1 | 3/2009 | Arimilli et al. |
| 2009/0063811 A1 | 3/2009 | Arimilli et al. |
| 2009/0063815 A1 | 3/2009 | Arimilli et al. |
| 2009/0063816 A1 | 3/2009 | Arimilli et al. |
| 2009/0063817 A1 | 3/2009 | Arimilli et al. |
| 2009/0063880 A1 | 3/2009 | Arimilli et al. |
| 2009/0063886 A1 | 3/2009 | Arimilli et al. |
| 2009/0063891 A1 | 3/2009 | Arimilli et al. |
| 2009/0064139 A1 | 3/2009 | Arimilli et al. |
| 2009/0064140 A1 | 3/2009 | Arimilli et al. |
| 2009/0070617 A1 | 3/2009 | Arimilli et al. |
| 2009/0198956 A1 | 8/2009 | Arimilli et al. |
| 2009/0198957 A1 | 8/2009 | Arimilli et al. |
| 2009/0198958 A1 | 8/2009 | Arimilli et al. |

FOREIGN PATENT DOCUMENTS

| | | |
|---|---|---|
| JP | 2000-307624 | 11/2000 |

OTHER PUBLICATIONS

U.S. Appl. No. 11/845,209, filed Aug. 27, 2007, Arimilli et al.
U.S. Appl. No. 11/845,211, filed Aug. 27, 2007, Arimilli et al.
U.S. Appl. No. 11/845,212, filed Aug. 27, 2007, Arimilli et al.
U.S. Appl. No. 11/845,213, filed Aug. 27, 2007, Arimilli et al.
U.S. Appl. No. 11/845,206, filed Aug. 27, 2007, Arimilli et al.
U.S. Appl. No. 11/845,217, filed Aug. 27, 2007, Arimilli et al.
U.S. Appl. No. 11/845,221, filed Aug. 27, 2007, Arimilli et al.
U.S. Appl. No. 11/845,223, filed Aug. 27, 2007, Arimilli et al.
U.S. Appl. No. 11/845,224, filed Aug. 27, 2007, Arimilli et al.
U.S. Appl. No. 11/845,225, filed Aug. 27, 2007, Arimilli et al.

U.S. Appl. No. 11/845,227, filed Aug. 27, 2007, Arimilli et al.
U.S. Appl. No. 11/848,440, filed Aug. 31, 2007, Arimilli et al.
U.S. Appl. No. 11/853,522, filed Sep. 11, 2007, Arimilli et al.
U.S. Appl. No. 12/024,514, filed Feb. 1, 2008, Arimilli et al.
U.S. Appl. No. 12/024,553, filed Feb. 1, 2008, Arimilli et al.
U.S. Appl. No. 12/024,662, filed Feb. 1, 2008, Arimilli et al.
Cheriton, David R., "Sirpent: A High-Performance Internetworking Approach", ACM, 1989, pp. 158-169.
Ramasubramanian et al., "SHARP: A Hybrid Adaptive Routing Protocol for Mobile Ad Hoc Networks", ACM, MobiHoc'03, Jun. 1-3, 2003, pp. 303-314.
Kodialam et al., "Dynamic Routing of Restorable Bandwidth-Guaranteed Tunnels Using Aggregated Network Resource Usage Information", IEEE/ACM Transactions on Networking, vol. 11, No. 3, Jun. 2003, pp. 399-410.
Li et al., "PANDA: A novel mechanism for flooding based route discovery in ad hoc networks", Wireless Netw (2006) 12:771-787, COI 10.1007/s11276-006-1324-3, pp. 771-787.
Juan Li, "ECSP: An Efficient Clustered Super-Peer Architecture for P2P Networks", Thesis, Master of Science, The University of British Columbia, Aug. 2003, 82 pages.
Traff, Jesper Larsson, "SMP-Aware Message Passing Programming", IPDPS2003 Proceedings, IEEE, 2003, 10 pages.
De Rybel et al., "OVNI-NET: A flexible cluster interconnect for the new OVNI Real-Time simulator", 15th PSCC, Liege, Session 38, Paper 2, Aug. 22-26, 2005, pp. 1-6.
Iyer et al., "Design and Evaluation of a Switch Cache Architecture for CC-NUMA Multiprocessors", IEEE Transactions on Computers, http://www.citeseer.ist.psu.edu/297975.html, v49, n8, 2000, pp. 779-797.
Alouneh et al., "A Novel Approach for Fault Tolerance in MPLS Networks", IEEE, Innovations in Information Technology, Nov. 2006, pp. 1-5.
Li et al., "Investigation of the Performance of GAFT, A Novel Network Anomaly Fault Detection System", Proceedings of the 27th Annual IEEE Conference on Local Computer Networks (LCN'02), Nov. 6-8, 2002, pp. 249-258.
"Fault-Tolerant Routing Algorithm for a Hypercube", IBM Technical Disclosure Bulletin, vol. 34, No. 12, May 1992, pp. 260-262.
"Traffic Redirection Technique in Multi-Speed Network Design", IBM Technical Disclosure Bulletin, vol. 34, No. 6, Nov. 1991, pp. 371-374.
McDonald, Bruce A., "Survey of Adaptive Shortest-Path Routing in Dynamic Packet-Switched Networks", Department of Information Science and Telecommunications at the University of Pittsburgh, Apr. 24, 1997, pp. 1-29.
Peng et al., "Intelligent routing protocol for ad hoc wireless network", Proceedings of the SPIE—The International Society for Optical Engineering, vol. 6248, No. 1, 62480R-621-12, 2006, 2 pages.
"BGP Scalability", Cisco Systems, Inc., CCIQ '99 Session 1624, 1999, pp. 1-28.
Gomaa, Mohamed A. et al., "Transient-Fault Recovery for Chip-Multiprocessors", Micro, IEEE, vol. 23, Issue 6, 2003, pp. 76-83.
Martin, Milo M. et al., "Using Destination-Set Prediction to Improve the Latency/Bandwidth Tradeoff in Shared-Memory Multiprocessors", Proceedings of the 30th Annual International Symposium on Computer Architecture, 2003, pp. 206-221.
Moshovos, Andreas, "RegionScout: Exploiting Coarse Grain Sharing in Snoop-Based Coherence", Proceedings of the 32nd International Symposium on Computer Architecture, 2005, pp. 234-245.
Shacham, Assaf et al., "Photonic NoC for DMA Communications in Chip Multiprocessors", 15th Annual IEEE Symposium on High-Performance Interconnects, HOTI 2007, pp. 29-38.
Tung, Cheng-Hsien , "A Scalable Orthogonal Multiprocessor Architecture", Signals, Systems and Computers, 1991 Conference Record of the Twenty-Fifth Asilomar Conference, vol. 1, 1991, pp. 59-63.
U.S. Appl. No. 11/845,209, Feb. 8, 2010, 2 pages.
U.S. Appl. No. 11/845,212, Feb. 8, 2010, 2 pages.
U.S. Appl. No. 11/845,213, Feb. 8, 2010, 2 pages.
U.S. Appl. No. 12/024,553, Feb. 8, 2010, 2 pages.
U.S. Appl. No. 12/024,662, Feb. 8, 2010, 2 pages.
Final Office Action mailed Mar. 24, 2010 for U.S. Appl. No. 11/845,209.
Interview Summary mailed Apr. 23, 2010 for U.S. Appl. No. 11/845,209.
Notice of Allowance mailed Mar. 30, 2010 for U.S. Appl. No. 12/024,553.
Notice of Allowance mailed Mar. 22, 2010 for U.S. Appl. No. 11/845,217.
Notice of Allowance mailed Mar. 23, 2010 for U.S. Appl. No. 11/845,221.
Office Action dated Mar. 29, 2010 for U.S. Appl. No. 11/845,212.
Office Action mailed Mar. 15, 2010 for U.S. Appl. No. 11/845,227.
Office Action mailed Apr. 26, 2010 for U.S. Appl. No. 11/845,206.
Office Action mailed Apr. 26, 2010 for U.S. Appl. No. 11/845,207.
Response to Final Office Action filed Apr. 27, 2010, for U.S. Appl. No. 11/845,212, 8 pages.
Choplin, Sebastien, "Virtual Path Layout in ATM Path with Given Hop Count", 2001 Springer-verlag Berlin Heidelberg, pp. 527-537.
Hadim, M.B. et al., "The Multi-Level Communication: Efficient Routing for Interconnection Networks", The Journal of Supercomputing, 2001 Kluwer Academic Publishers, pp. 153-177.
Interview Summary mailed Jun. 4, 2010 for U.S. Appl. No. 11/845,227, 4 pages.
Interview Summary mailed Jul. 14, 2010 for U.S. Appl. No. 11/845,206, 11 pages.
Interview Summary mailed Jul. 15, 2010 for U.S. Appl. No. 11/845,207, 11 pages.
Notice of Allowance mailed May 6, 2010 for U.S. Appl. No. 11/845,212, 6 pages.
Notice of Allowance mailed May 20, 2010 for U.S. Appl. No. 11/845,225, 28 pages.
Notice of Allowance mailed Jun. 10, 2010 for U.S. Appl. No. 11/845,209, 12 pages.
Notice of Allowance mailed Jun. 23, 2010 for U.S. Appl. No. 11/848,440, 24 pages.
Notice of Allowance mailed Jul. 14, 2010 for U.S. Appl. No. 11/845,213, 9 pages.
Office Action mailed Apr. 29, 2010 for U.S. Appl. No. 11/845,224, 23 pages.
Office Action mailed Jun. 22, 2010 for U.S. Appl. No. 11/853,522, 23 pages.
Bermond, Jean-Claude et al., "Directed Virtual Path Layouts in ATM networks", 2004, pp. 1-26.
Daliot, Ariel et al., "Self-Stabilizing Pulse Synchronization Inspired by Biological Pacemaker Networks", SSS 2003, LNCS 2704, 2003, pp. 32-48.
Frigui, Hichem et al., "Clustering Based on Synchronization of Pulse-Coupled Oscillators", IEEE, 2000, pp. 128-132.
Padmanabhan, V.N. et al., "Point to Point Communication Using Virtual Channel Flow Control and Wormhole Routing", Indian Institute of Technology, Delhi, May 1993, pp. 1-77.
Platania, Marco, "Clock Synchronization", Sapienza University of Rome, 2009, 66 pages.
Rhouma, Mohamed Ben H. et al., "Self-Organization of Pulse-Coupled Oscillators with Application to Clustering", IEEE, Feb. 2001, vol. 23, No. 2, pp. 180-195.
Final Office Action mailed Aug. 3, 2010 for U.S. Appl. No. 11/845,227, 39 pages.
Interview Summary mailed Sep. 13, 2010 for U.S. Appl. No. 11/845,227, 4 pages.
Office Action mailed Jun. 22, 2010 for U.S. Appl. No. 11/853,522, 23 pages.
Office Action mailed Aug. 5, 2010 for U.S. Appl. No. 11/845,223, 45 pages.
Office Action mailed Sep. 14, 2010 for U.S. Appl. No. 12/024,514, 36 pages.
Response to Office Action filed with the USPTO on Jul. 26, 2010 for U.S. Appl. No. 11/845,206, 21 pages.
Response to Office Action filed with the USPTO on Jul. 26, 2010 for U.S. Appl. No. 11/845,207, 21 pages.
Response to Office Action filed with the USPTO on Jul. 29, 2010 for U.S. Appl. No. 11/845,224, 13 pages.
Final Office Action mailed Oct. 12, 2010 for U.S. Appl. No. 11/845,206; 33 pages.

Final Office Action mailed Oct. 12, 2010 for U.S. Appl. No. 11/845,207; 32 pages.
Interview Summary mailed Nov. 12, 2010, U.S. Appl. No. 11/845,223, 4 pages.
Notice of Allowance mailed Nov. 30, 2010 for U.S. Appl. No. 11/853,522; 8 pages.
Office Action mailed Oct. 6, 2010 for U.S. Appl. No. 11/845,211; 30 pages.
Office Action mailed Oct. 18, 2010 for U.S. Appl. No. 11/845,224; 10 pages.
Response to Final Office Action filed Nov. 3, 2010, U.S. Appl. No. 11/845,227, 27 pages.
Response to Office Action filed Nov. 5, 2010, U.S. Appl. No. 11/845,223, 23 pages.
Response to Office Action filed with the USPTO on Sep. 21, 2010 for U.S. Appl. No. 11/853,522, 10 pages.
Response to Office Action filed with the USPTO on Dec. 14, 2010 for U.S. Appl. No. 12/024,514, 18 pages.

* cited by examiner

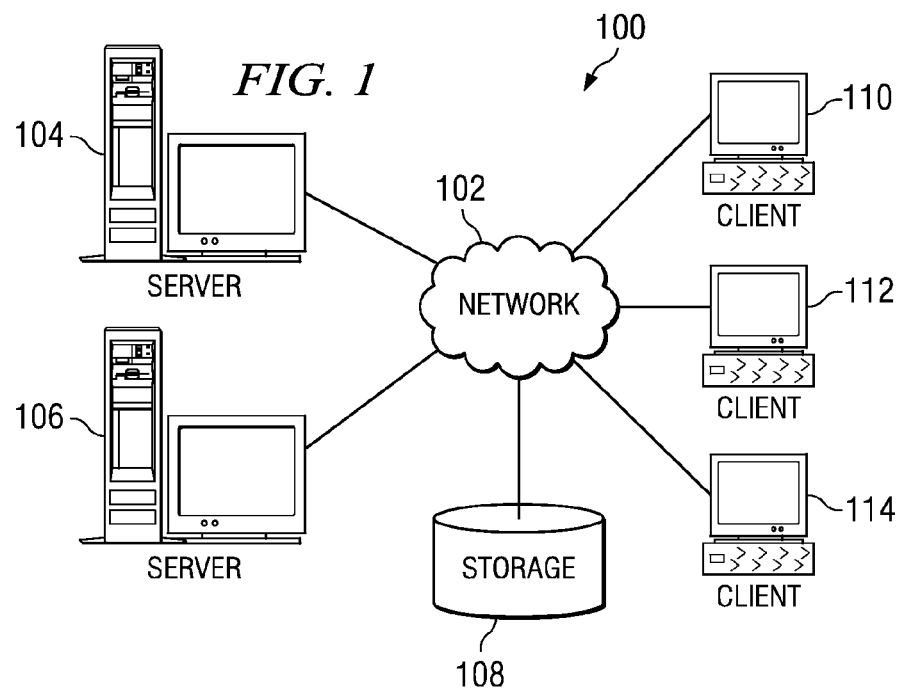
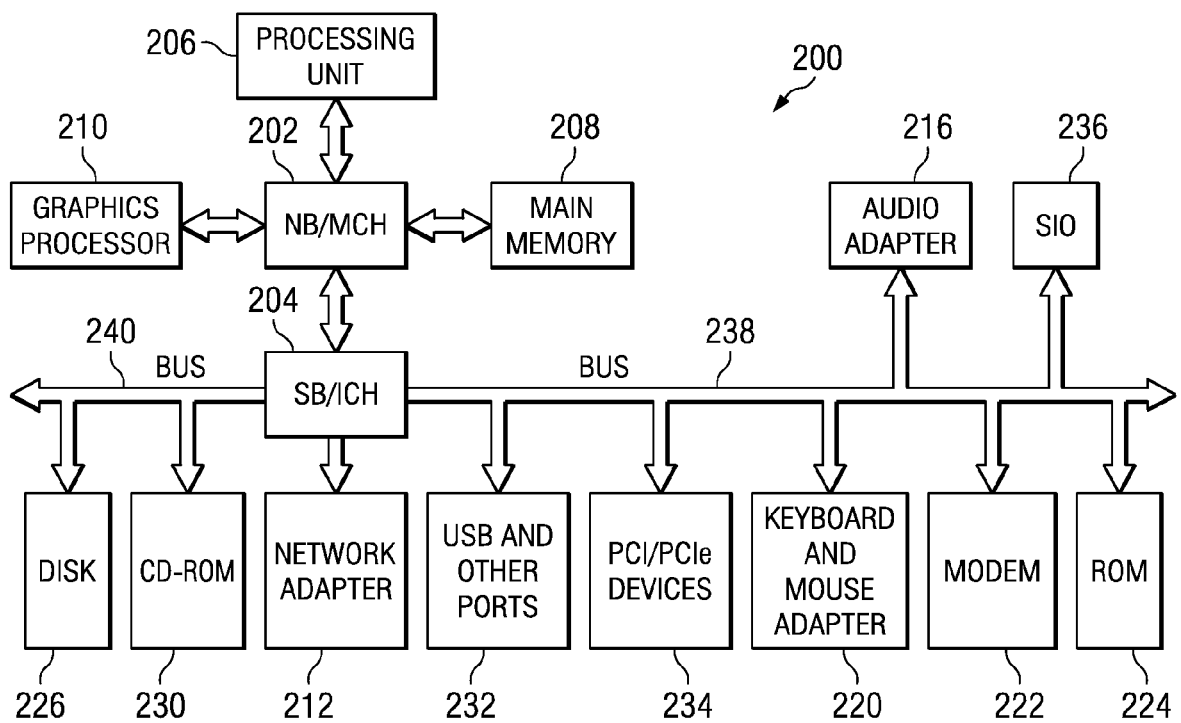

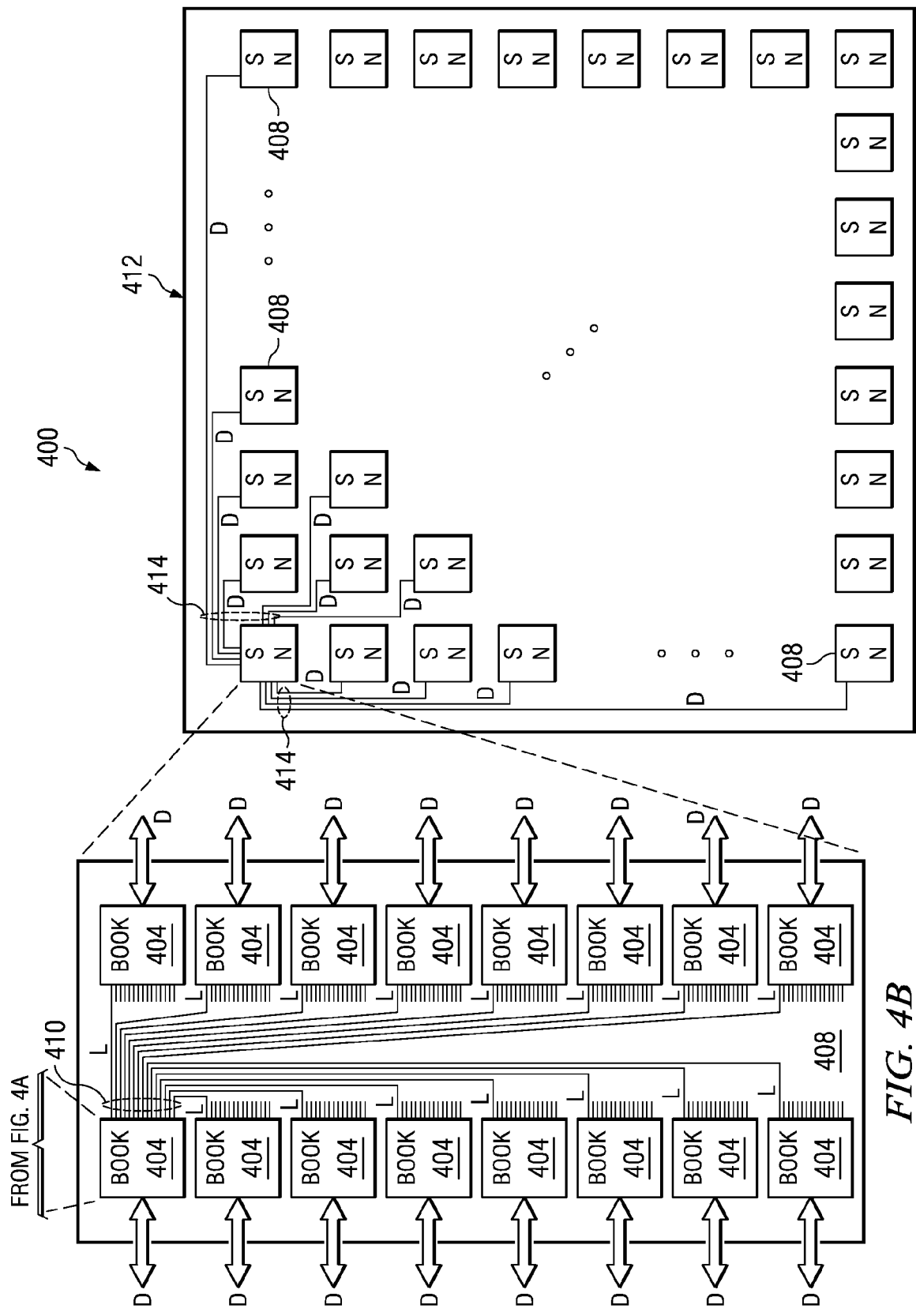

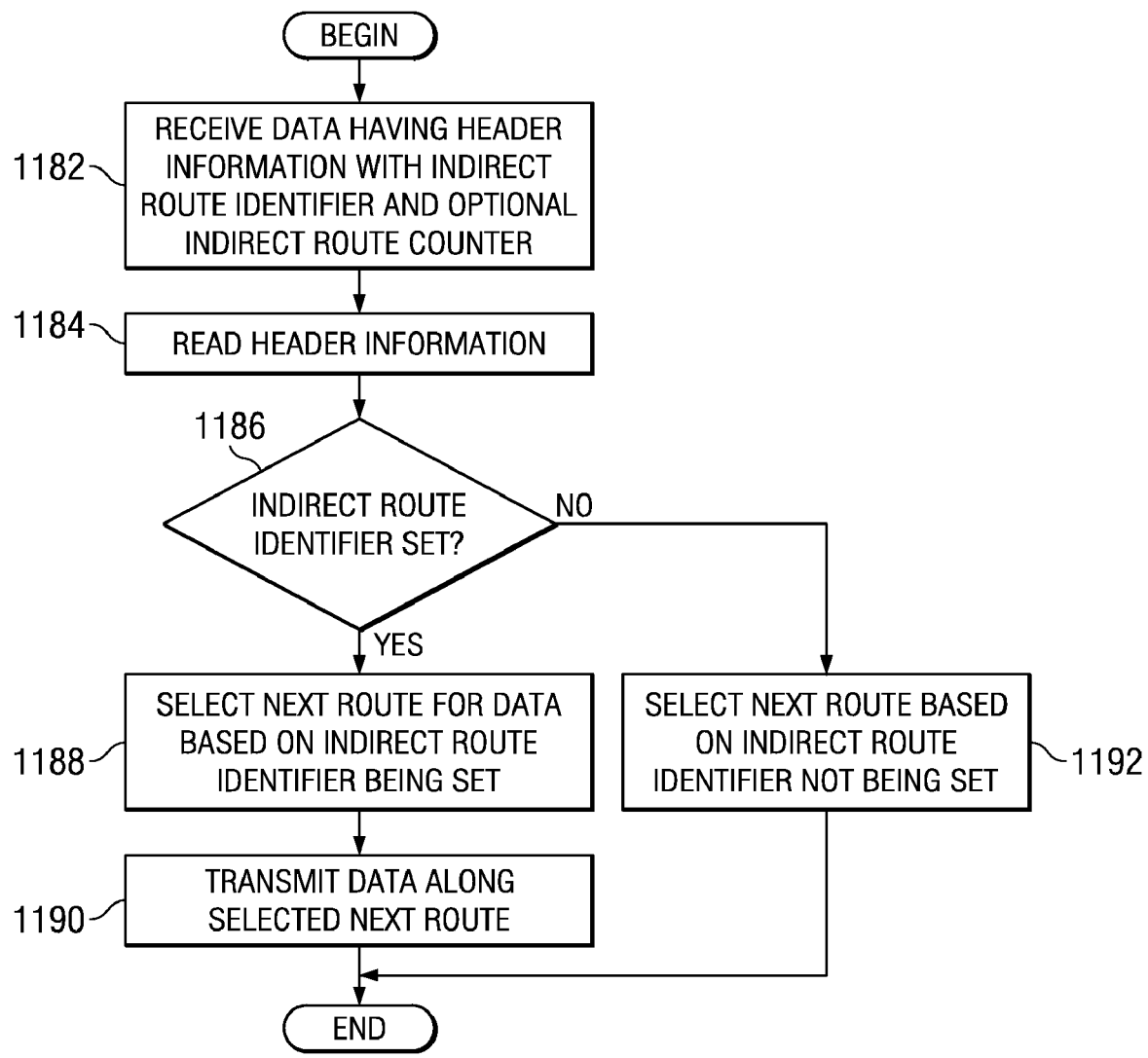

FIG. 13

| SUPERNODE ROUTE TABLE | | | |
|---|---|---|---|
| SN_ID | ROUTE (ZLZD) 1314 | NDR 1304 | NIDR 1306 |
| 806 | (838-840), (840-842), (842-844), (844-830) | | X |
| ○ ○ ○ | ○  1310  ○ | ○ ○ ○ | ○ ○ ○ |
| 804 | (844-842), (842-840), (840-838), (838-828) | | |
| ○ ○ ○ | ○  1310  ○ | ○ ○ ○ | ○ ○ ○ |
| N | | | |

1308, 1316 mark the 806 and 804 rows; 1312 marks the X; 1310 marks the circled route segments.

FIG. 15

| SUPERNODE ROUTE TABLE 1504 | | | | PRIORITY TABLE 1506 | |
|---|---|---|---|---|---|
| ROUTE (ZLZD) 1508 | | LAST USED 1502 | POINTER 1510 | PRIORITY 1514 | POINTER 1512 |
| (Z-BUS 1), (L-BUS 1), (Z-BUS 2), (D-BUS 1) | | | | 1 | |
| ○ ○ ○ | | ○ ○ ○ | ○ ○ ○ | ○ ○ ○ | ○ ○ ○ |
| (Z-BUS 1), (L-BUS 1), (Z-BUS 2), (D-BUS 2) | | X | PTR 3 | 4 | |
| ○ ○ ○ | | ○ ○ ○ | ○ ○ ○ | ○ ○ ○ | ○ ○ ○ |
| (Z-BUS 3), (L-BUS 2), (Z-BUS 4), (D-BUS 3) | | | | 5 | PTR 5 |

US 7,904,590 B2

ROUTING INFORMATION THROUGH A DATA PROCESSING SYSTEM IMPLEMENTING A MULTI-TIERED FULL-GRAPH INTERCONNECT ARCHITECTURE

GOVERNMENT RIGHTS

This invention was made with Government support under DARPA, HR0011-07-9-0002. THE GOVERNMENT HAS CERTAIN RIGHTS IN THIS INVENTION.

BACKGROUND

1. Technical Field

The present application relates generally to an improved data processing system and method. More specifically, the present application is directed to routing information through a data processing system that is implementing a multi-tiered full-graph interconnect architecture.

2. Description of Related Art

Ongoing advances in distributed multi-processor computer systems have continued to drive improvements in the various technologies used to interconnect processors, as well as their peripheral components. As the speed of processors has increased, the underlying interconnect, intervening logic, and the overhead associated with transferring data to and from the processors have all become increasingly significant factors impacting performance. Performance improvements have been achieved through the use of faster networking technologies (e.g., Gigabit Ethernet), network switch fabrics (e.g., Infiniband, and RapidIO®), TCP offload engines, and zero-copy data transfer techniques (e.g., remote direct memory access). Efforts have also been increasingly focused on improving the speed of host-to-host communications within multi-host systems. Such improvements have been achieved in part through the use of high-speed network and network switch fabric technologies.

SUMMARY

The illustrative embodiments provide an architecture and mechanisms for facilitating communication between processors or nodes, collections of nodes, and supernodes. The illustrative embodiments provide a highly-configurable, scalable system that integrates computing, storage, networking, and software. The illustrative embodiments provide for a multi-tiered full-graph interconnect architecture that improves communication performance for parallel or distributed programs and improves the productivity of the programmer and system. The architecture is comprised of a plurality of processors or nodes that are associated with one another as a collection referred to as processor "books."

The illustrative embodiments provide for routing information through a data processing system. In the illustrative embodiments, the data processing system comprises a plurality of supernodes, the plurality of supernodes comprises a plurality of processor books, and the plurality of processor books comprises a plurality of processors. The illustrative embodiments receive data at a source processor within a set of processors that is to be transmitted to a destination processor, wherein the data includes address information. The illustrative embodiments perform a first determination as to whether the destination processor is within a same processor book as the source processor based on the address information. The illustrative embodiments perform a second determination as to whether the destination processor is within a same supernode as the source processor based on the address information if the destination processor is not within the same processor book. The illustrative embodiments identify a routing path for the data based on results of the first determination, the second determination, and one or more routing table data structures. Finally, the illustrative embodiments transmit the data from the source processor along the identified routing path toward the destination processor.

In the illustrative embodiments, the address information may include a processor book identifier and a supernode identifier of the destination processor. In performing the first determination, the illustrative embodiments may compare the processor book identifier in the address information with a processor book identifier associated with the source processor. In the illustrative embodiments, the destination processor may be determined to be within a same processor book as the source processor if the processor book identifier associated with the source processor matches the processor book identifier in the address information.

In performing the second determination, the illustrative embodiments may compare the supernode identifier in the address information with a supernode identifier associated with the source processor. In the illustrative embodiments, the destination processor may be determined to be within a same supernode as the source processor if the supernode identifier associated with the source processor matches the supernode identifier in the address information.

In identifying the routing path for the data based on results of the first determination, the second determination, and one or more routing table data structures the illustrative embodiments may perform a lookup operation of a processor chip identifier in the address information in a processor chip routing table data structure if results of the first determination indicate that the destination processor is within a same processor book as the source processor. A result of the lookup operation of the processor chip identifier may be a path within the same processor book from the source processor to the destination processor.

In identifying the routing path for the data based on results of the first determination, the second determination, and one or more routing table data structures the illustrative embodiments may perform a lookup operation of a processor book identifier in the address information in a processor book routing table data structure if results of the first determination indicate that the destination processor is not within a same processor book as the source processor and the second determination indicates that the destination processor is within a same supernode as the source processor. A result of the lookup operation of the processor book identifier may be a path within the same supernode from the source processor to a processor in a processor book in which the destination processor is provided.

In identifying the routing path for the data based on results of the first determination, the second determination, and one or more routing table data structures the illustrative embodiments may perform a lookup operation of the supernode identifier in the address information in a supernode routing table data structure if results of the first determination indicate that the destination processor is not within a same processor book as the source processor and the second determination indicates that the destination processor is not within a same supernode as the source processor. A result of the lookup operation of the supernode identifier is a path between supernodes from the source processor to a processor in another supernode in the data processing system.

In the illustrative embodiments, the path from the source processor to a processor in another supernode may be a direct path, and the another supernode may be a supernode in which the destination processor is provided. In the illustrative embodiments, the path from the source processor to a processor in another supernode may be an indirect path, and the another supernode may be an intermediary supernode in which the destination processor is not provided.

In the illustrative embodiments, the one or more routing table data structures comprises a processor chip routing table data structure, a processor book routing table data structure, and a supernode routing table data structure, and wherein each processor within the set of processors has each of the one or more routing table data structures.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an exemplary representation of an exemplary distributed data processing system in which aspects of the illustrative embodiments may be implemented;

FIG. 2 is a block diagram of an exemplary data processing system in which aspects of the illustrative embodiments may be implemented;

FIGS. 4A and 4B depict an example of such a multi-tiered full-graph interconnect architecture in accordance with one illustrative embodiment;

FIG. 11B is a flowchart outlining an exemplary operation for selecting a route based on whether or not the data has been previously routed through an indirect route to the current processor, in accordance with one illustrative embodiment;

FIG. 13 depicts an exemplary supernode routing table data structure that supports dynamic selection of routing within a multi-tiered full-graph interconnect architecture using no-direct and no-indirect fields in accordance with one illustrative embodiment;

FIG. 15 depicts an exemplary diagram illustrating a supernode routing table data structure having a last used field that is used when selecting from multiple direct routes in accordance with one illustrative embodiment;

DETAILED DESCRIPTION OF THE ILLUSTRATIVE EMBODIMENTS

Figure 3:
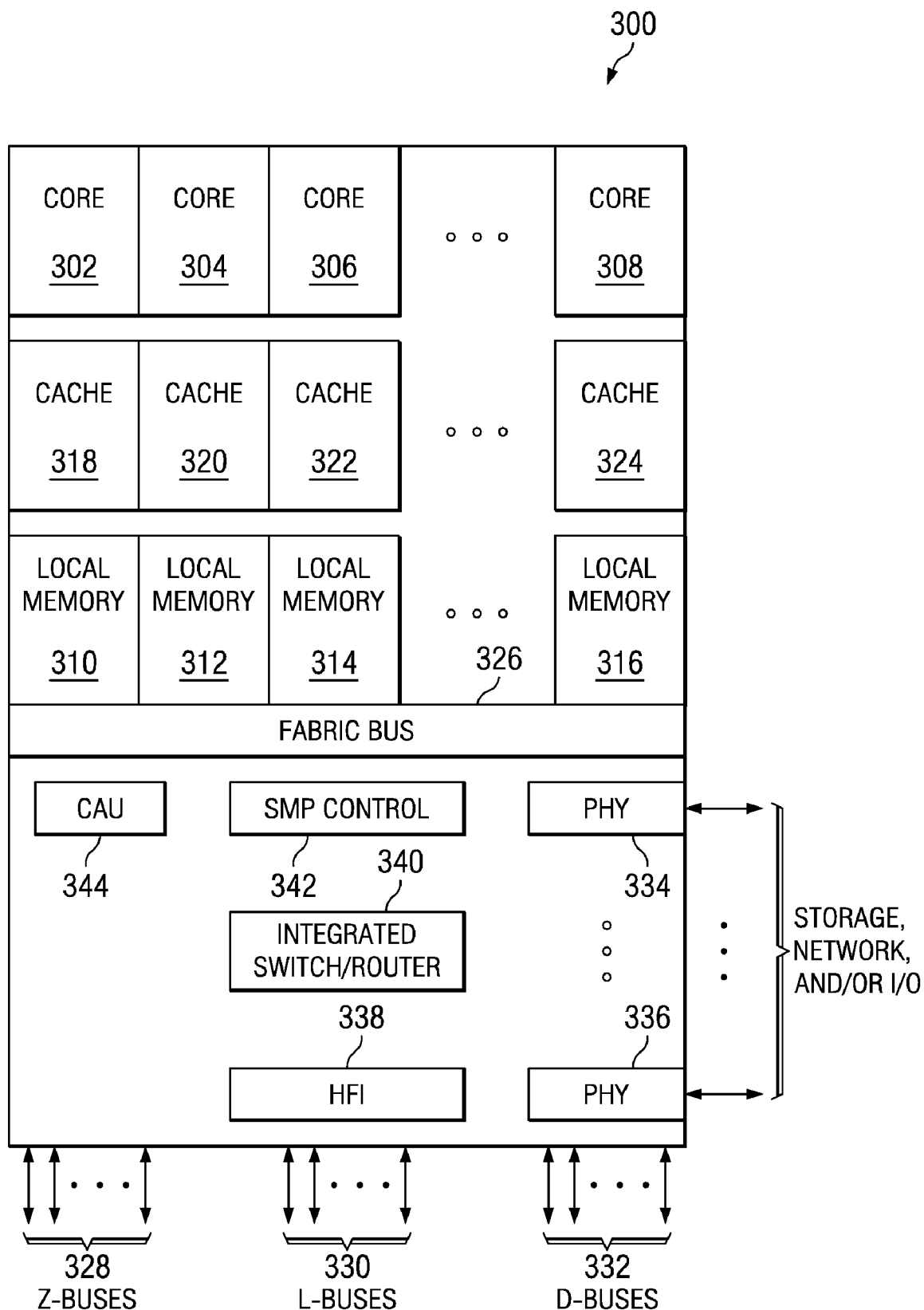
FIG. 3 depicts an exemplary logical view of a processor chip, which may be a "node" in the multi-tiered full-graph interconnect architecture, in accordance with one illustrative embodiment.

The illustrative embodiments provide an architecture and mechanisms for facilitating communication between processors, or nodes collections of nodes, and supernodes. As such, the mechanisms of the illustrative embodiments are especially well suited for implementation within a distributed data processing environment and within, or in association with, data processing devices, such as servers, client devices, and the like. In order to provide a context for the description of the mechanisms of the illustrative embodiments, FIGS. 1-2 are provided hereafter as examples of a distributed data processing system, or environment, and a data processing device, in which, or with which, the mechanisms of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p™ computer system, running the Advanced Interactive Executive (AIX®) operating system or the LINUX® operating system (eServer, System p™ and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors, such as the POWER™ processor available from International Business Machines Corporation of Armonk, N.Y., in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide a highly-configurable, scalable system that integrates computing, storage, networking, and software. The illustrative embodiments provide for a multi-tiered full-graph interconnect architecture that improves communication performance for parallel or distributed programs and improves the productivity of the programmer and system. The architecture is comprised of a plurality of processors or nodes, that are associated with one another as a collection referred to as processor "books." A processor "book" may be defined as a collection of processor chips having local connections for direct communication between the processors. A processor "book" may further contain physical memory cards, one or more I/O hub cards, and the like. The processor "books" are in turn in communication with one another via a first set of direct connections such that a collection of processor books with such direct connections is referred to as a "supernode." Supernodes may then be in communication with one another via external communication links between the supernodes. With such an architecture, and the additional mechanisms of the illustrative embodiments described hereafter, a multi-tiered full-graph interconnect is provided in which maximum bandwidth is provided to each of the processors or nodes, such that enhanced performance of parallel or distributed programs is achieved.

FIG. 3 depicts an exemplary logical view of a processor chip, which may be a "node" in the multi-tiered full-graph interconnect architecture, in accordance with one illustrative embodiment. Processor chip 300 may be a processor chip such as processing unit 206 of FIG. 2. Processor chip 300 may be logically separated into the following functional components: homogeneous processor cores 302, 304, 306, and 308, and local memory 310, 312, 314, and 316. Although processor cores 302, 304, 306, and 308 and local memory 310, 312, 314, and 316 are shown by example, any type and number of processor cores and local memory may be supported in processor chip 300.

Processor chip 300 may be a system-on-a-chip such that each of the elements depicted in FIG. 3 may be provided on a single microprocessor chip. Moreover, in an alternative embodiment processor chip 300 may be a heterogeneous processing environment in which each of processor cores 302, 304, 306, and 308 may execute different instructions from each of the other processor cores in the system. Moreover, the instruction set for processor cores 302, 304, 306, and 308 may be different from other processor cores, that is, one processor core may execute Reduced Instruction Set Computer (RISC) based instructions while other processor cores execute vectorized instructions. Each of processor cores 302, 304, 306, and 308 in processor chip 300 may also include an associated one of cache 318, 320, 322, or 324 for core storage.

Processor chip 300 may also include an integrated interconnect system indicated as Z-buses 328, L-buses 330, and D-buses 332. Z-buses 328, L-buses 330, and D-buses 332 provide interconnection to other processor chips in a three-tier complete graph structure, which will be described in detail below. The integrated switching and routing provided by interconnecting processor chips using Z-buses 328, L-buses 330, and D-buses 332 allow for network communications to devices using communication protocols, such as a message passing interface (MPI) or an internet protocol (IP), or using communication paradigms, such as global shared memory, to devices, such as storage, and the like.

Additionally, processor chip 300 implements fabric bus 326 and other I/O structures to facilitate on-chip and external data flow. Fabric bus 326 serves as the primary on-chip bus for processor cores 302, 304, 306, and 308. In addition, fabric bus 326 interfaces to other on-chip interface controllers that are dedicated to off-chip accesses. The on-chip interface controllers may be physical interface macros (PHYs) 334 and 336 that support multiple high-bandwidth interfaces, such as PCIx, Ethernet, memory, storage, and the like. Although PHYs 334 and 336 are shown by example, any type and number of PHYs may be supported in processor chip 300. The specific interface provided by PHY 334 or 336 is selectable, where the other interfaces provided by PHY 334 or 336 are disabled once the specific interface is selected.

Processor chip 300 may also include host fabric interface (HFI) 338 and integrated switch/router (ISR) 340. HFI 338 and ISR 340 comprise a high-performance communication subsystem for an interconnect network, such as network 102 of FIG. 1. Integrating HFI 338 and ISR 340 into processor chip 300 may significantly reduce communication latency and improve performance of parallel applications by drastically reducing adapter overhead. Alternatively, due to various chip integration considerations (such as space and area constraints), HFI 338 and ISR 340 may be located on a separate chip that is connected to the processor chip. HFI 338 and ISR 340 may also be shared by multiple processor chips, permitting a lower cost implementation. Processor chip 300 may also include symmetric multiprocessing (SMP) control 342 and collective acceleration unit (CAU) 344. Alternatively, these SMP control 342 and CAU 344 may also be located on a separate chip that is connected to processor chip 300. SMP control 342 may provide fast performance by making multiple cores available to complete individual processes simultaneously, also known as multiprocessing. Unlike asymmetrical processing, SMP control 342 may assign any idle processor core 302, 304, 306, or 308 to any task and add additional ones of processor core 302, 304, 306, or 308 to improve performance and handle increased loads. CAU 344 controls the implementation of collective operations (collectives), which may encompass a wide range of possible algorithms, topologies, methods, and the like.

HFI 338 acts as the gateway to the interconnect network. In particular, processor core 302, 304, 306, or 308 may access HFI 338 over fabric bus 326 and request HFI 338 to send messages over the interconnect network. HFI 338 composes the message into packets that may be sent over the interconnect network, by adding routing header and other information to the packets. ISR 340 acts as a router in the interconnect network. ISR 340 performs three functions: ISR 340 accepts network packets from HFI 338 that are bound to other destinations, ISR 340 provides HFI 338 with network packets that are bound to be processed by one of processor cores 302, 304, 306, and 308, and ISR 340 routes packets from any of Z-buses 328, L-buses 330, or D-buses 332 to any of Z-buses 328, L-buses 330, or D-buses 332. CAU 344 improves the system performance and the performance of collective operations by carrying out collective operations within the interconnect network, as collective communication packets are sent through the interconnect network. More details on each of these units will be provided further along in this application.

By directly connecting HFI 338 to fabric bus 326, by performing routing operations in an integrated manner through ISR 340, and by accelerating collective operations through CAU 344, processor chip 300 eliminates much of the interconnect protocol overheads and provides applications with improved efficiency, bandwidth, and latency.

It should be appreciated that processor chip 300 shown in FIG. 3 is only exemplary of a processor chip which may be used with the architecture and mechanisms of the illustrative embodiments. Those of ordinary skill in the art are well aware that there are a plethora of different processor chip designs currently available, all of which cannot be detailed herein. Suffice it to say that the mechanisms of the illustrative embodiments are not limited to any one type of processor chip design or arrangement and the illustrative embodiments may be used with any processor chip currently available or which may be developed in the future. FIG. 3 is not intended to be limiting of the scope of the illustrative embodiments but is only provided as exemplary of one type of processor chip that may be used with the mechanisms of the illustrative embodiments.

As mentioned above, in accordance with the illustrative embodiments, processor chips, such as processor chip 300 in FIG. 3, may be arranged in processor "books," which in turn may be collected into "supernodes." Thus, the basic building block of the architecture of the illustrative embodiments is the processor chip, or node. This basic building block is then arranged using various local and external communication connections into collections of processor books and supernodes. Local direct communication connections between processor chips designate a processor book. Another set of direct communication connections between processor chips enable communication with processor chips in other books. A fully connected group of processor books is called a supernode. In a supernode, there exists a direct communication connection between the processor chips in a particular book to processor chips in every other book. Thereafter, yet another different set of direct communication connections between processor chips enables communication to processor chips in other supernodes. The collection of processor chips, processor books, supernodes, and their various communication connections or links gives rise to the multi-tiered full-graph interconnect architecture of the illustrative embodiments.

Figure 4A:
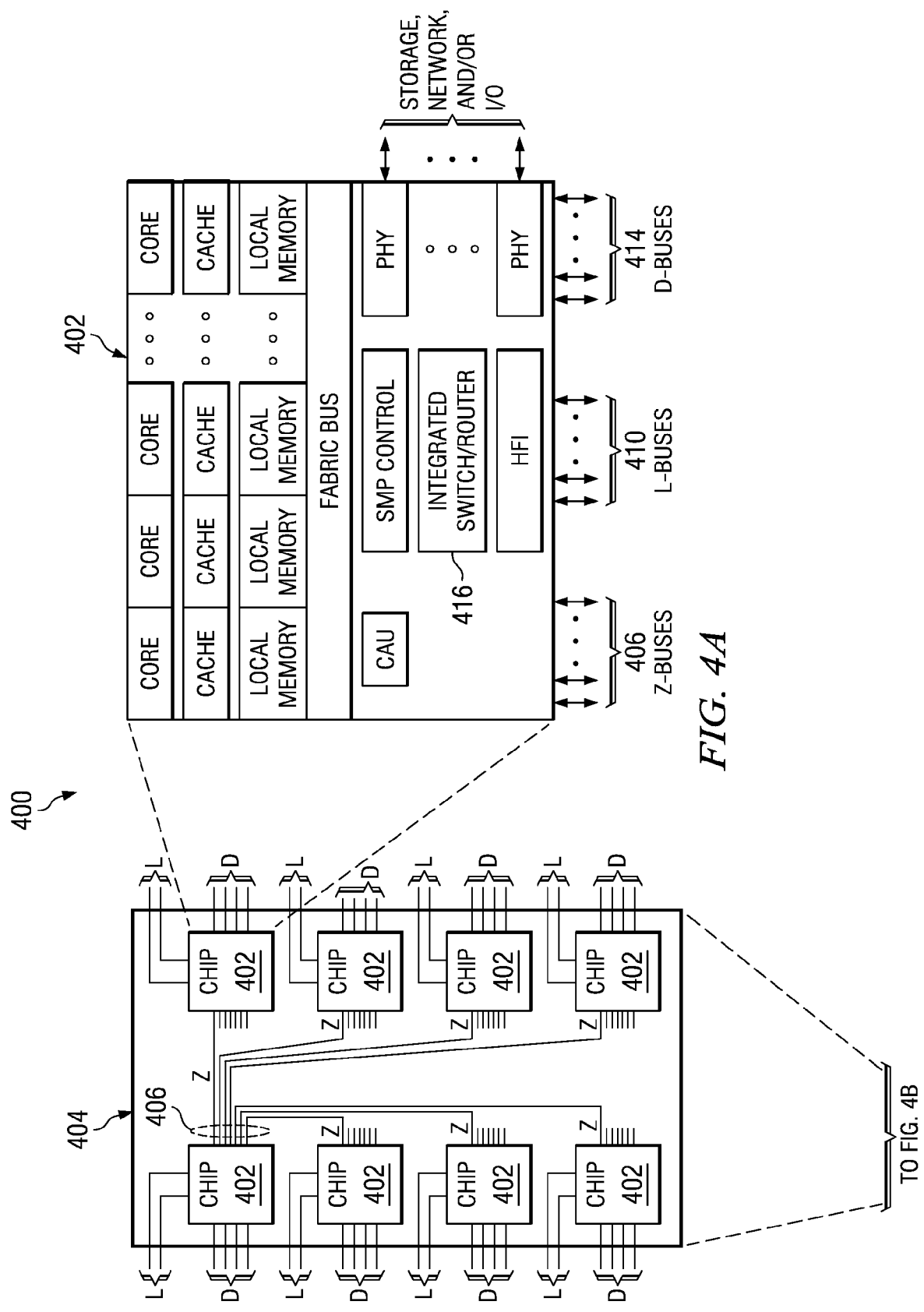

FIGS. 4A and 4B depict an example of such a multi-tiered full-graph interconnect architecture in accordance with one illustrative embodiment. In a data communication topology 400, processor chips 402, which again may each be a processor chip 300 of FIG. 3, for example, is the main building block. In this example, a plurality of processor chips 402 may be used and provided with local direct communication links to create processor book 404. In the depicted example, eight processor chips 402 are combined into processor book 404, although this is only exemplary and other numbers of processor chips, including only one processor chip, may be used to designate a processor book without departing from the spirit and scope of the present invention. For example, any power of 2 number of processor chips may be used to designate a processor book. In the context of the present invention, a "direct" communication connection or link means that the particular element, e.g., a processor chip, may communicate data with another element without having to pass through an intermediary element. Thus, an "indirect" communication connection or link means that the data is passed through at least one intermediary element before reaching a destination element.

In processor book 404, each of the eight processor chips 402 may be directly connected to the other seven processor chips 402 via a bus, herein referred to as "Z-buses" 406 for identification purposes. FIG. 4A indicates unidirectional Z-buses 406 connecting from only one of processor chips 402 for simplicity. However, it should be appreciated that Z-buses 406 may be bidirectional and that each of processor chips 402 may have Z-buses 406 connecting them to each of the other processor chips 402 within the same processor book. Each of Z-buses 406 may operate in a base mode where the bus operates as a network interface bus, or as a cache coherent symmetric multiprocessing (SMP) bus enabling processor book 404 to operate as a 64-way (8 chips/book×8-way/chip) SMP node. The terms "8-way," "64-way", and the like, refer to the number of communication pathways a particular element has with other elements. Thus, an 8-way processor chip has 8 communication connections with other processor chips. A 64-way processor book has 8 processor chips that each have 8 communication connections and thus, there are 8×8 communication pathways. It should be appreciated that this is only exemplary and that other modes of operation for Z-buses 406 may be used without departing from the spirit and scope of the present invention.

As depicted, a plurality of processor books 404, e.g., sixteen in the depicted example, may be used to create supernode (SN) 408. In the depicted SN 408, each of the sixteen processor books 404 may be directly connected to the other fifteen processor books 404 via buses, which are referred to herein as "L-buses" 410 for identification purposes. FIG. 4B indicates unidirectional L-buses 410 connecting from only one of processor books 404 for simplicity. However, it should be appreciated that L-buses 410 may be bidirectional and that each of processor books 404 may have L-buses 410 connecting them to each of the other processor books 404 within the same supernode. L-buses 410 may be configured such that they are not cache coherent, i.e. L-buses 410 may not be configured to implement mechanisms for maintaining the coherency, or consistency, of caches associated with processor books 404.

It should be appreciated that, depending on the symmetric multiprocessor (SMP) configuration selected, SN 408 may have various SMP communication connections with other SNs. For example, in one illustrative embodiment, the SMP configuration may be set to either be a collection of 128 8-way SMP supernodes (SNs) or 16 64-way SMP supernodes. Other SMP configurations may be used without departing from the spirit and scope of the present invention.

In addition to the above, in the depicted example, a plurality of SNs 408 may be used to create multi-tiered full-graph (MTFG) interconnect architecture network 412. In the depicted example, 512 SNs are connected via external communication connections (the term "external" referring to communication connections that are not within a collection of elements but between collections of elements) to generate MTFG interconnect architecture network 412. While 512 SNs are depicted, it should be appreciated that other numbers of SNs may be provided with communication connections between each other to generate a MTFG without departing from the spirit and scope of the present invention.

In MTFG interconnect architecture network 412, each of the 512 SNs 408 may be directly connected to the other 511 SNs 408 via buses, referred to herein as "D-buses" 414 for identification purposes. FIG. 4B indicates unidirectional D-buses 414 connecting from only one of SNs 408 for simplicity. However, it should be appreciated that D-buses 414 may be bidirectional and that each of SNs 408 may have D-buses 414 connecting them to each of the other SNs 408 within the same MTFG interconnect architecture network 412. D-buses 414, like L-buses 410, may be configured such that they are not cache coherent.

Again, while the depicted example uses eight processor chips 402 per processor book 404, sixteen processor books 404 per SN 408, and 512 SNs 408 per MTFG interconnect architecture network 412, the illustrative embodiments recognize that a processor book may again contain other numbers of processor chips, a supernode may contain other numbers of processor books, and a MTFG interconnect architecture network may contain other numbers of supernodes. Furthermore, while the depicted example considers only Z-buses 406 as being cache coherent, the illustrative embodiments recognize that L-buses 410 and D-buses 414 may also be cache coherent without departing from the spirit and scope of the present invention. Furthermore, Z-buses 406 may also be non cache-coherent. Yet again, while the depicted example shows a three-level multi-tiered full-graph interconnect, the illustrative embodiments recognize that multi-tiered full-graph interconnects with different numbers of levels are also possible without departing from the spirit and scope of the present invention. In particular, the number of tiers in the MTFG interconnect architecture could be as few as one or as many as may be implemented. Thus, any number of buses may be used with the mechanisms of the illustrative embodiments. That is, the illustrative embodiments are not limited to requiring Z-buses, D-buses, and L-buses. For example, in an illustrative embodiment, each processor book may be comprised of a single processor chip, thus, only L-buses and D-buses are utilized. The example shown in FIGS. 4A and 4B is only for illustrative purposes and is not intended to state or imply any limitation with regard to the numbers or arrangement of elements other than the general organization of processors into processor books, processor books into supernodes, and supernodes into a MTFG interconnect architecture network.

Taking the above described connection of processor chips 402, processor books 404, and SNs 408 as exemplary of one illustrative embodiment, the interconnection of links between processor chips 402, processor books 404, and SNs 408 may be reduced by at least fifty percent when compared to externally connected networks, i.e. networks in which processors communicate with an external switch in order to communicate with each other, while still providing the same bisection of bandwidth for all communication. Bisection of bandwidth is defined as the minimum bi-directional bandwidths obtained when the multi-tiered full-graph interconnect is bisected in every way possible while maintaining an equal number of nodes in each half. That is, known systems, such as systems that use fat-tree switches, which are external to the processor chip, only provide one connection from a processor chip to the fat-tree switch. Therefore, the communication is limited to the bandwidth of that one connection. In the illustrative embodiments, one of processor chips 402 may use the entire bisection of bandwidth provided through integrated switch/router (ISR) 416, which may be ISR 340 of FIG. 3, for example, to either:

communicate to another processor chip 402 on a same processor book 404 where processor chip 402 resides via Z-buses 406, communicate to another processor chip 402 on a different processor book 404 within a same SN 408 via L-buses 410, or communicate to another processor chip 402 in another processor book 404 in another one of SNs 408 via D-buses 414.

That is, if a communicating parallel "job" being run by one of processor chips 402 hits a communication point, i.e. a point in the processing of a job where communication with another processor chip 402 is required, then processor chip 402 may use any of the processor chip's Z-buses 406, L-buses 410, or D-buses 414 to communicate with another processor as long as the bus is not currently occupied with transferring other data. Thus, by moving the switching capabilities inside the processor chip itself instead of using switches external to the processor chip, the communication bandwidth provided by the multi-tiered full-graph interconnect architecture of data communication topology 400 is made relatively large compared to known systems, such as the fat-tree switch based network which again, only provides a single communication link between the processor and an external switch complex.

Figure 5:
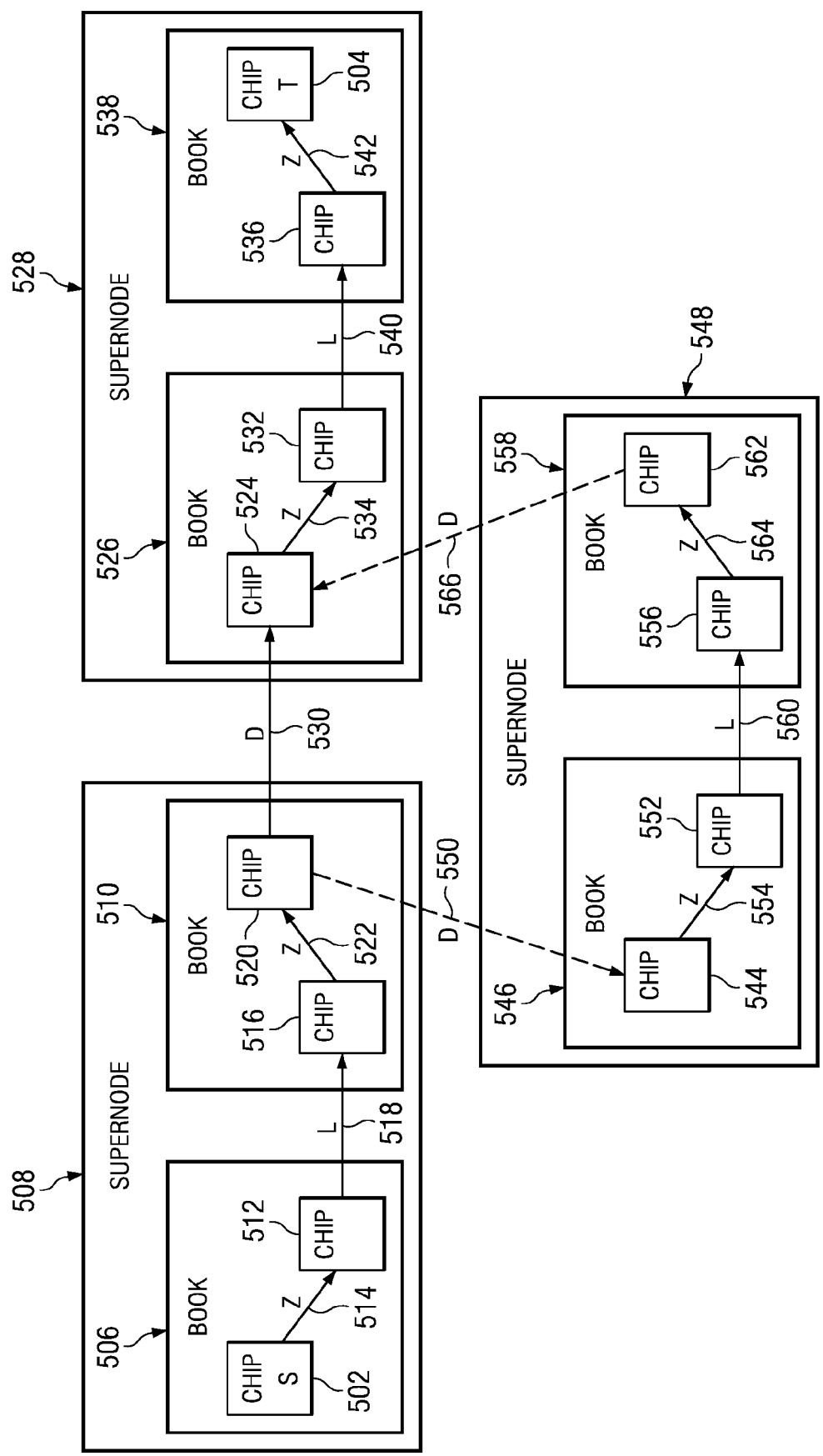
FIG. 5 depicts an example of direct and indirect transmissions of information using a multi-tiered full-graph interconnect architecture in accordance with one illustrative embodiment.

FIG. 5 depicts an example of direct and indirect transmissions of information using a multi-tiered full-graph interconnect architecture in accordance with one illustrative embodiment. It should be appreciated that the term "direct" as it is used herein refers to using a single bus, whether it be a Z-bus, L-bus, or D-bus, to communicate data from a source element (e.g., processor chip, processor book, or supernode), to a destination or target element (e.g., processor chip, processor book, or supernode). Thus, for example, two processor chips in the same processor book have a direct connection using a single Z-bus. Two processor books have a direct connection using a single L-bus. Two supernodes have a direct connection using a single D-bus. The term "indirect" as it is used herein refers to using a plurality of buses, i.e. any combination of Z-buses, L-buses, and/or D-buses, to communicate data from a source element to a destination or target element. The term indirect refers to the usage of a path that is longer than the shortest path between two elements.

FIG. 5 illustrates a direct connection with respect to the D-bus 530 and an indirect connection with regard to D-buses 550 and 556. As shown in the example depicted in FIG. 5, in multi-tiered full-graph (MTFG) interconnect architecture 500, processor chip 502 transmits information, e.g., a data packet or the like, to processor chip 504 via Z-buses, L-buses, and D-buses. For simplicity in illustrating direct and indirect transmissions of information, supernode (SN) 508 is shown to include processor books 506 and 510 for simplicity of the description, while the above illustrative embodiments show that a supernode may include numerous books. Likewise, processor book 506 is shown to include processor chip 502 and processor chip 512 for simplicity of the description, while the above illustrative embodiments indicate that a processor book may include numerous processor chips.

As an example of a direct transmission of information, processor chip 502 initializes the transmission of information to processor chip 504 by first transmitting the information on Z-bus 514 to processor chip 512. Then, processor chip 512 transmits the information to processor chip 516 in processor book 510 via L-bus 518. Processor chip 516 transmits the information to processor chip 520 via Z-bus 522 and processor chip 520 transmits the information to processor chip 524 in processor book 526 of SN 528 via D-bus 530. Once the information arrives in processor chip 524, processor chip 524 transmits the information to processor chip 532 via Z-bus 534. Processor chip 532 transmits the information to processor chip 536 in processor book 538 via L-bus 540. Finally, processor chip 536 transmits the information to processor chip 504 via Z-bus 542. Each of the processor chips, in the path the information follows from processor chip 502 to processor chip 504, determines its own routing using routing table topology that is specific to each processor chip. This direct routing table topology will be described in greater detail hereafter with reference to FIG. 15. Additionally, the exemplary direct path is the longest direct route, with regard to the D-bus, that is possible in the depicted system within the routing scheme of the illustrative embodiments.

As an example of an indirect transmission of information, with regard to the D-buses, processor chip 502 generally transmits the information through processor chips 512 and 516 to processor chip 520 in the same manner as described above with respect to the direct transmission of information. However, if D-bus 530 is not available for transmission of data to processor chip 524, or if the full outgoing interconnect bandwidth from SN 508 were desired to be utilized in the transmission, then processor chip 520 may transmit the information to processor chip 544 in processor book 546 of SN 548 via D-bus 550. Once the information arrives in processor chip 544, processor chip 544 transmits the information to processor chip 552 via Z-bus 554. Processor chip 552 transmits the information to processor chip 556 in processor book 558 via L-bus 560. Processor chip 556 then transmits the information to processor chip 562 via Z-bus 564 and processor chip 562 transmits the information to processor chip 524 via D-bus 566. Once the information arrives in processor chip 524, processor chip 524 transmits the information through processor chips 532 and 536 to processor chip 504 in the same manner as described above with respect to the direct transmission of information. Again, each of the processor chips, in the path the information follows from processor chip 502 to processor chip 504, determines its own routing using routing table topology that is specific to each processor chip. This indirect routing table topology will be described in greater detail hereafter with reference to FIG. 15.

Thus, the exemplary direct and indirect transmission paths provide the most non-limiting routing of information from processor chip 502 to processor chip 504. What is meant by "non-limiting" is that the combination of the direct and indirect transmission paths provide the resources to provide full bandwidth connections for the transmission of data during substantially all times since any degradation of the transmission ability of one path will cause the data to be routed through one of a plurality of other direct or indirect transmission paths to the same destination or target processor chip. Thus, the ability to transmit data is not limited when paths become available due to the alternative paths provided through the use of direct and indirect transmission paths in accordance with the illustrative embodiments.

That is, while there may be only one minimal path available to transmit information from processor chip 502 to processor chip 504, restricting the communication to such a path may constrain the bandwidth available for the two chips to communicate. Indirect paths may be longer than direct paths, but permit any two communicating chips to utilize many more of the paths that exist between them. As the degree of indirectness increases, the extra links provide diminishing returns in terms of useable bandwidth. Thus, while the direct route from processor chip 502 to processor chip 504 shown in FIG. 5 uses only 7 links, the indirect route from processor chip 502 to processor chip 504 shown in FIG. 5 uses 11 links. Furthermore, it will be understood by one skilled in the art that when processor chip 502 has more than one outgoing Z-bus, it could use those to form an indirect route. Similarly, when processor chip 502 has more than one outgoing L-bus, it could use those to form indirect routes.

Thus, through the multi-tiered full-graph interconnect architecture of the illustrative embodiments, multiple direct communication pathways between processors are provided such that the full bandwidth of connections between processors may be made available for communication. Moreover, a large number of redundant, albeit indirect, pathways may be provided between processors for use in the case that a direct pathway is not available, or the full bandwidth of the direct pathway is not available, for communication between the processors.

By organizing the processor chips, processor books, and supernodes in a multi-tiered full-graph arrangement, such redundancy of pathways is made possible. The ability to utilize the various communication pathways between processors is made possible by the integrated switch/router (ISR) of the processor chips which selects a communication link over which information is to be transmitted out of the processor chip. Each of these ISRs, as will be described in greater detail hereafter, stores one or more routing tables that are used to select between communication links based on previous pathways taken by the information to be communicated, current availability of pathways, available bandwidth, and the like. The switching performed by the ISRs of the processor chips of a supernode is performed in a fully non-blocking manner. By "fully non-blocking" what is meant is that it never leaves any potential switching bandwidth unused if possible. If an output link has available capacity and there is a packet waiting on an input link to go to it, the ISR will route the packet if possible. In this manner, potentially as many packets as there are output links get routed from the input links. That is, whenever an output link can accept a packet, the switch will strive to route a waiting packet on an input link to that output link, if that is where the packet needs to be routed. However, there may be many qualifiers for how a switch operates that may limit the amount of usable bandwidth.

Figure 6:
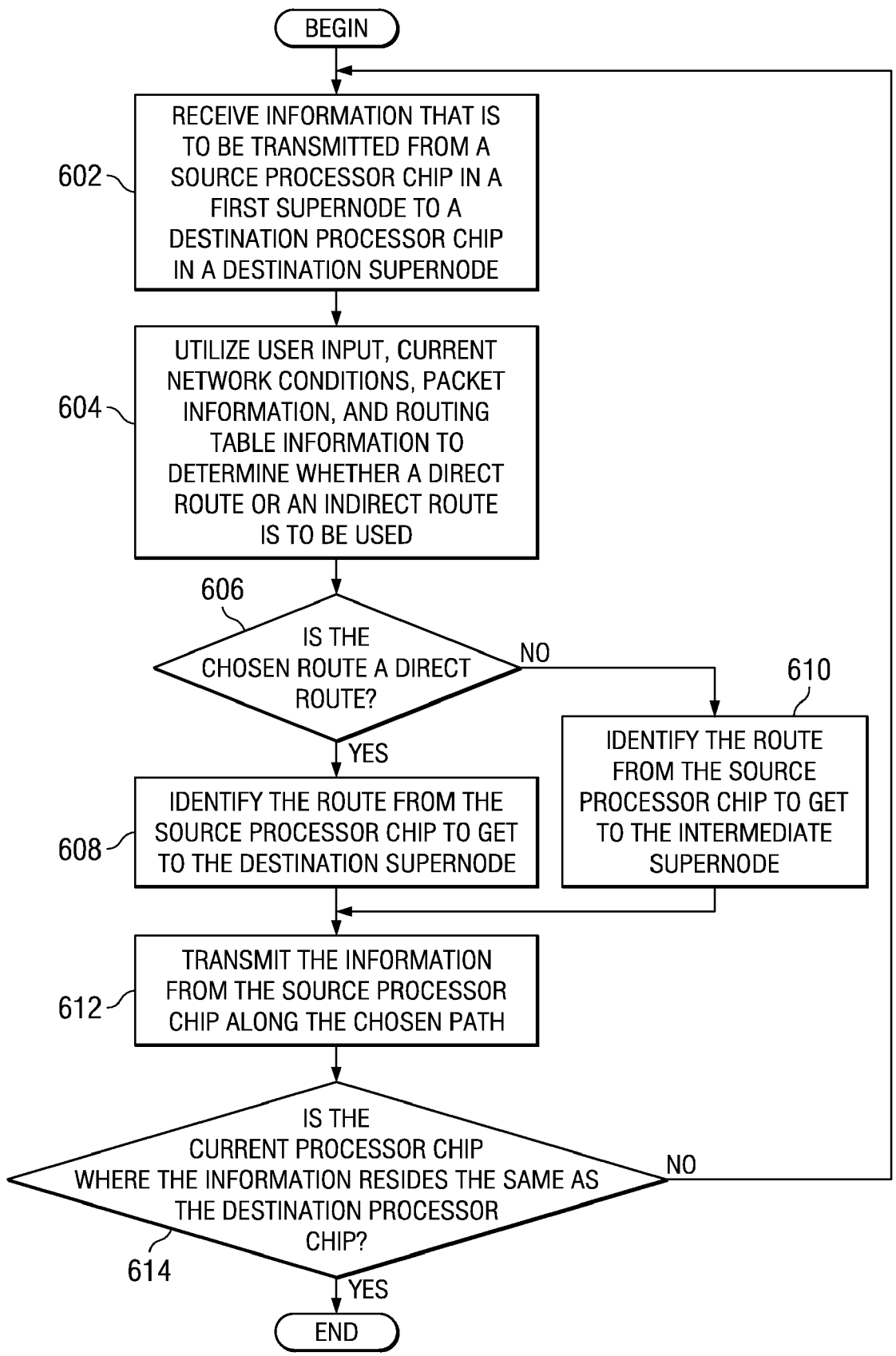
FIG. 6 depicts a flow diagram of the operation performed in the direct and indirect transmissions of information using a multi-tiered full-graph interconnect architecture in accordance with one illustrative embodiment.

FIG. 6 depicts a flow diagram of the operation performed in the direct and indirect transmissions of information using a multi-tiered full-graph interconnect architecture in accordance with one illustrative embodiment. FIGS. 6, 8, 10, 11B, 12, 14A, 14B, 16, 18, 20, and 22 are flowcharts that illustrate the exemplary operations according to the illustrative embodiments. It will be understood that each block of the flowchart illustrations, and combinations of blocks in the flowchart illustrations, may be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks.

These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

With regard to FIG. 6, the operation begins when a source processor chip, such as processor chip 502 of FIG. 5, in a first supernode receives information, e.g., a data packet or the like, that is to be transmitted to a destination processor chip via buses, such as Z-buses, L-buses, and D-buses (step 602). The integrated switch/router (ISR) that is associated with the source processor chip analyzes user input, current network conditions, packet information, routing tables, or the like, to determine whether to use a direct pathway or an indirect pathway from the source processor chip to the destination processor chip through the multi-tiered full-graph architecture network (step 604). The ISR next checks if a direct path is to be used or if an indirect path is to be used (step 606).

Here, the terms "direct" and "indirect" may be with regard to any one of the buses, Z-bus, L-bus, or D-bus. Thus, if the source and destination processor chips are within the same processor book, a direct path between the processor chips may be made by way of a Z-bus. If the source and destination processor chips are within the same supernode, either a direct path using a single L-bus may be used or an indirect path using one or more Z and L-buses (that is longer than the shortest path connecting the source and destination) may be used. Similarly, if the source and destination processor chips are in separate supernodes, either a direct path using a single D-bus may be used (which may still involve one or more Z and L-buses to get the data out of the source supernode and within the destination supernode to get the data to the destination processor chip) or an indirect path using a plurality of D-paths (where such a path is indirect because it uses more buses than required in the shortest path between the source and the destination) may be used.

If at step 606 a direct pathway is determined to have been chosen to transmit from the source processor chip to the destination processor chip, the ISR identifies the initial component of the direct path to use for transmission of the information from the source processor chip to the destination supernode (step 608). If at step 606 an indirect pathway is determined to have been chosen to transmit from the source processor chip to the destination processor chip, the ISR identifies the initial component of the indirect path to use for transmission of the information from the source processor chip to an intermediate supernode (step 610). From step 608 or 610, the ISR initiates transmission of the information from the source processor chip along the identified direct or indirect pathway (step 612). After the ISR of the source processor chip transmits the data to the last processor chip along the identified path, the ISR of the processor chip where the information resides determines if it is the destination processor chip (step 614). If at step 614 the ISR determines that the processor chip where the information resides is not the destination processor chip, the operation returns to step 602 and may be repeated as necessary to move the information from the point to which it has been transmitted, to the destination processor chip.

If at step 614, the processor chip where the information resides is the destination processor chip, the operation terminates. An example of a direct transmission of information and an indirect transmission of information is shown in FIG. 5 above. Thus, through the multi-tiered full-graph interconnect architecture of the illustrative embodiments, information may be transmitted from a one processor chip to another processor chip using multiple direct and indirect communication pathways between processors.

Figure 7:
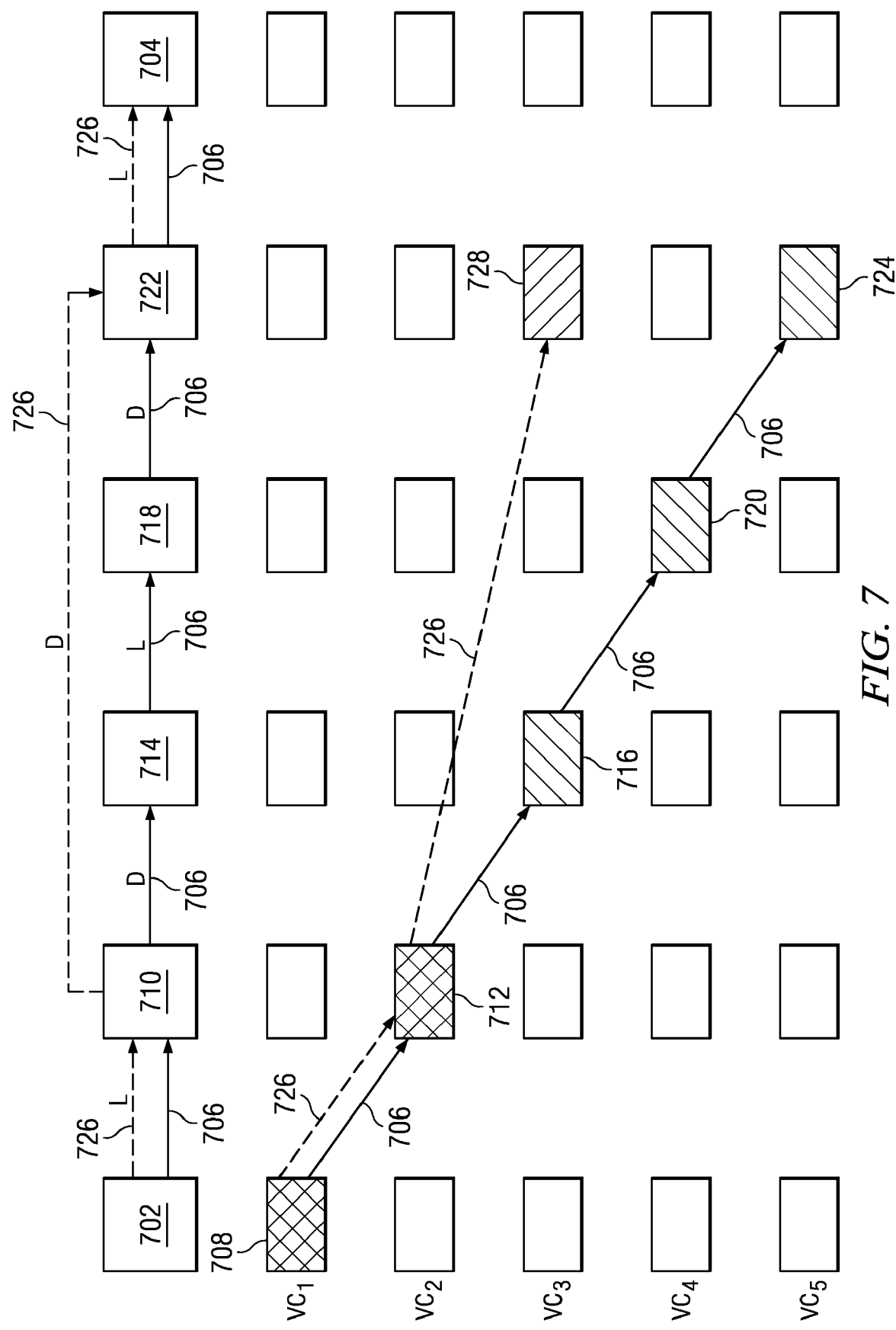
FIG. 7 depicts a fully non-blocking communication of information through a multi-tiered full-graph interconnect architecture network utilizing the integrated switch/routers in the processor chips of the supernode in accordance with one illustrative embodiment.

FIG. 7 depicts a fully non-blocking communication of information through a multi-tiered full-graph interconnect architecture utilizing the integrated switch/routers in the processor chips of the supernode in accordance with one illustrative embodiment. In this example, processor chip 702, which may be an example of processor chip 502 of FIG. 5, for example, transmits information to processor chip 704, which may be processor chip 504 of FIG. 5, for example, via L-buses and D-buses, and processor chips 710-722. For simplicity in illustrating direct and indirect transmissions of information in this example, only the L-buses and D-buses are shown in order to illustrate the routing from a processor chip of one processor book of a supernode to another processor chip of another processor book of another supernode. It should be appreciated that additional routing operations may be performed within a processor book as will be described in greater detail hereafter.

In the depicted example, in order to transmit information from a source processor chip 702 to a destination processor chip 704 through indirect route 706, as in the case of the indirect route (that ignores the Z-buses) shown in FIG. 5, there is a minimum of five virtual channels, $VC_1$, $VC_2$, $VC_3$, $VC_4$, and $VC_5$, in a switch, such as integrated switch/router 340 of FIG. 3, for each processor chip required to transmit the information and provide a fully non-blocking switch system. The virtual channels may be any type of data structure, such as a buffer, a queue, and the like, that represents a communication connection with another processor chip. The switch provides the virtual channels for each port of the processor chip, allocating one VC for every hop of the longest route in the network. For example, for a processor chip, such as processor chip 402 of FIG. 4A, that has eight Z-buses, four D-buses, and two L-buses, where the longest indirect path is (voluntarily) constrained to be ZLZDZLZDZLZ, the ISR will provide eleven virtual channels for each port for a total of one-hundred and fifty four virtual channels per processor chip. Each of the virtual channels within the ISR are at different levels and each level is used by the specific processor chip based on the position of the specific processor chip within the route the information is taking from a source processor chip to a destination processor chip.

For indirect route 706 transmission, processor chip 702 stores the information in $VC_1$ 708 since processor chip 702 is the source of the information being transmitted. When the information is transmitted from processor chip 702 to processor chip 710, the ISR of processor chip 710 stores the information in $VC_2$ 712 since processor chip 710 is the second "hop" in the path the information is being transmitted. Header information in the data packets or the like, that make up the information being transmitted may maintain hop identification information, e.g., a counter or the like, by which the ISRs of the processor chips may determine in which VC to place the information. Such a counter may be incremented with each hop along indirect route 706. In another alternative embodiment, identifiers of the processor chips that have handled the information during its path from processor chip 702 to processor chip 704 may be added to the header information.

When the information is transmitted from processor chip 710 to processor chip 714, the ISR of processor chip 714 stores the information in $VC_3$ 716. When the information is transmitted from processor chip 714 to processor chip 718, the ISR of processor chip 718 stores the information in $VC_4$ 720. And finally, when the information is transmitted from processor chip 718 to processor chip 722, the ISR of processor chip 722 stores the information in $VC_5$ 724. Then, the information is transmitted from processor chip 722 to processor chip 704 where processor chip 704 processes the information and thus, it is not necessary to maintain the information in a VC data structure.

As an example of direct route transmission, with regard to the D-bus, in order to transmit information from processor chip 702 to processor chip 704 through direct route 726, as in the case of the direct route shown in FIG. 5, three virtual channels $VC_1$, $VC_2$, and $VC_3$ are used to transmit the information and provide a fully non-blocking switch system. For direct route 726 transmission, the ISR of processor chip 702 stores the information in $VC_1$ 708. When the information is transmitted from processor chip 702 to processor chip 710, the ISR of processor chip 710 stores the information in $VC_2$ 712. When the information is transmitted from processor chip 710 to processor chip 722, the ISR of processor chip 722 stores the information in $VC_3$ 728. Then the information is transmitted from processor chip 722 to processor chip 704 where processor chip 704 processes the information and thus, does not maintain the information in a VC data structure.

These principles are codified in the following exemplary pseudocode algorithm that is used to select virtual channels. Here, VCZ, VCD, and VCL represent the virtual channels pre-allocated for the Z, L, and D ports respectively.

```
** VC's are used to prevent deadlocks in the network. **
** 6 VC's are used for Z-ports, 3 VC's are used for L-ports, and 2 VC's
are used for D-ports in this exemplary pseudocode. **
** Exemplary VC selection Algorithm **
    next_Z = next_L = next_D = 0
    for each hop
        if hop is Z
            VCZ = next_Z++
        if hop is L
            next_Z = next_L * 2 + 1
            VCL = next_L++
        if hop is D
            next_Z = next_D * 2 + 2
            next_L = next_D + 1
            VCD = next_D++
```

Thus, the number of virtual channels needed to transmit information from a source processor chip to a destination processor chip is dependent on the number of processor chips in the route from the source processor chip to the destination processor chip. The number of virtual channels that are available for use may be hardcoded in the switch architecture, or may be dynamically allocated up to a maximum pre-determined number of VCs based on an architecture discovery operation, or the like. The number of virtual channels that are provided for in the ISRs determines the maximum hop count of any route in the system. Thus, a MTFG interconnect architecture may require any number of virtual channels per processor chip, such as three, five, seven, nine, or the like. Providing the appropriate amount of virtual channels allows for the most efficient use of a fully bisectional bandwidth network while providing a fully non-blocking switch system.

Additionally, each of the virtual channels must be of sufficient depth, so that, the switch operates in a non-blocking manner. That is, the depth or size of the virtual channels may be dynamically changed by the ISRs so that, if half of the processor chips in the network are transmitting information and half of the processor chips in the network are receiving information, then the ISRs may adjust the depth of each virtual channel such the that network operates in a fully non-blocking manner. Allocating the depth or the size of the virtual channels may be achieved, for example, by statically allocating a minimum number of buffers to each virtual channel and then dynamically allocating the remainder from a common pool of buffers, based on need.

In order to provide communication pathways between processors or nodes, processor books, and supernodes, a plurality of redundant communication links are provided between these elements. These communication links may be provided as any of a number of different types of communication links including optical fibre links, wires, or the like. The redundancy of the communication links permits various reliability functions to be performed so as to ensure continued operation of the MTFG interconnect architecture network even in the event of failures.

Figure 8:
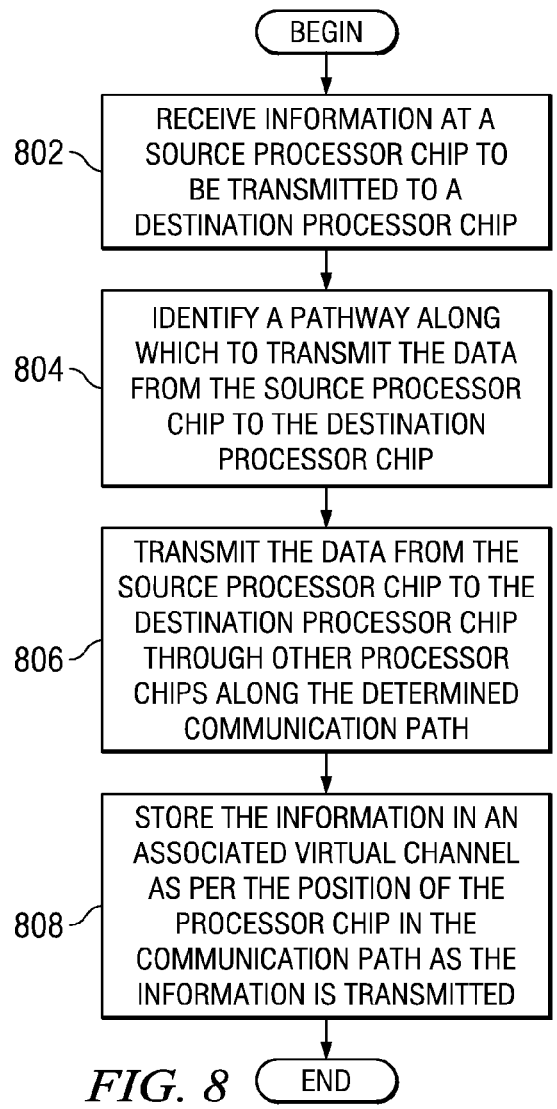
FIG. 8 depicts a flow diagram of the operation performed in the fully non-blocking communication of information through a multi-tiered full-graph interconnect architecture network utilizing the integrated switch/routers (ISRs) in the processor chips of the supernode in accordance with one illustrative embodiment.

FIG. 8 depicts a flow diagram of the operation performed in the fully non-blocking communication of information through a multi-tiered full-graph interconnect architecture utilizing the integrated switch/routers in the processor chips of the supernode in accordance with one illustrative embodiment. As the operation begins, an integrated switch/router (ISR), such as ISR 340 of FIG. 3, of a source processor chip receives information that is to be transmitted to a destination processor chip (step 802). Using the routing tables (e.g., see FIG. 11A described hereafter), each ISR along a route from the source processor chip to the destination processor chip identifies a pathway for transmitting the information from itself to a next processor chip along the pathway (step 804). The ISR(s) then transmit the information along the pathway from the source processor chip to the destination processor chip (step 806). As the information is transmitted along the pathway, each ISR stores the information in the virtual channels that is associated with its position along the pathway from the source processor chip to the destination processor chip until the information arrives at the destination processor chip (step 808), with the operation ending thereafter.

Thus, the number of virtual channels needed to transmit information from a source processor chip to a destination processor chip is dependent on the number of processor chips in the route from the source processor chip to the destination processor chip.

Figure 9:
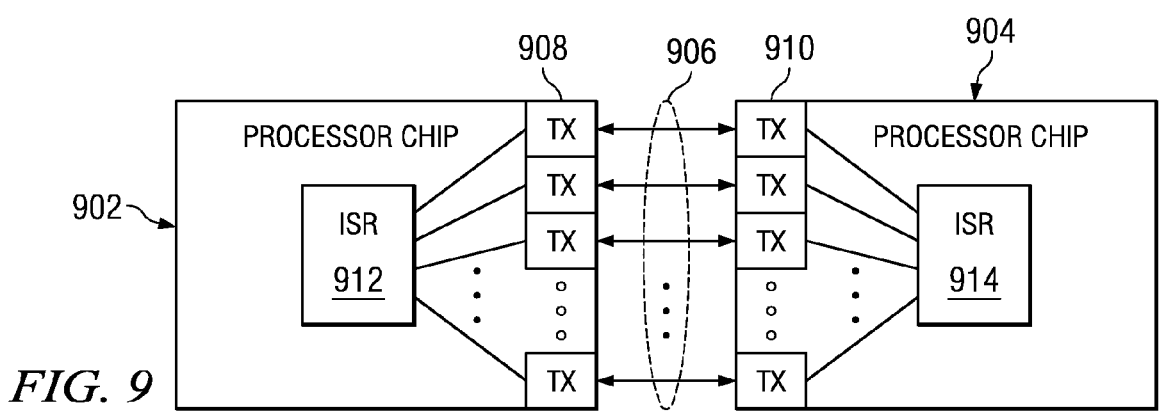
FIG. 9 depicts an example of port connections between two elements of a multi-tiered full-graph interconnect architecture in order to provide a reliability of communication between supernodes in accordance with one illustrative embodiment.

FIG. 9 depicts an example of port connections between two elements of a multi-tiered full-graph interconnect architecture in order to provide a reliability of communication between supernodes in accordance with one illustrative embodiment. It should be appreciated that FIG. 9 shows a direct connection between processor chips 902 and 904, however similar connections may be provided between a plurality of processor chips in a chain formation. Moreover, each processor chip may have separate transceivers 908 and communication links 906 for each possible processor chip with which it is directly connected.

With the illustrative embodiments, for each port, either Z-bus, D-bus, or L-bus, originating from a processor chip, such as processor chip 402 of FIG. 4A, there may be one or more optical fibers, wires, or other type of communication link, that connects to one or more processor chips in the same or different processor book or the same or a different supernode of the multi-tiered full-graph (MTFG) interconnect architecture network. In the case of optical fibers, there may be instances during manufacturing, shipping, usage, adjustment, or the like, where the one or more optical fibers may not work all of the time, thereby reducing the number of optical fiber lanes available to the processor chip and to the fully bisectional bandwidth available to the MTFG interconnect architecture network. In the event that one or more of the optical fiber lanes are not available due to one or more optical fibers not working for some reason, the MTFG interconnect architecture supports identifying the various non-available optical fiber lanes and using the port but at a reduced capacity since one or more of the optical fiber lanes is not available.

Additionally, the MTFG interconnect architecture supports identifying optical fiber lanes, as well as wired lanes, that are experiencing high errors as determined by performing error correction code (ECC) or cyclic redundancy checking (CRC). In performing ECC, data that is being read or transmitted may be checked for errors and, when necessary, the data may be corrected on the fly. In cyclic redundancy checking (CRC), data that has been transmitted on the optical fiber lanes or wired lanes is checked for errors. With ECC or CRC, if the error rates are too high based on a predetermined threshold value, then the MTFG interconnect architecture supports identifying the optical fiber lanes or the wired lanes as unavailable and the port is still used but at a reduced capacity since one or more of the lanes is unavailable.

An illustration of the identification of optical fiber lanes or wired lanes as unavailable may be made with reference to FIG. 9. As shown in FIG. 9, processor chips 902 and 904 are connected bi-directionally by communication links 906, which may be a multi-fiber (at least one fiber) optical link or a multi-wire (at least one wire) link. ISR 912 associated with transceivers 908, which may be PHY 334 or 336 of the processor chip 300 in FIG. 3, for example, on processor chip 902 retains characteristic information of the particular one of communication links 906 on which the transceiver 908 receives information from processor chip 904. Likewise, ISR 914 associated with transceiver 910 on processor chip 904 retains the characteristic information of the particular one of communication links 906 on which transceiver 910 receives information from processor chip 902. These "characteristics" represent the current state of communication links 906, e.g., traffic across the communication link, the ECC and CRC information indicating a number of errors detected, and the like.

For example, the characteristic information may be maintained in one or more routing table data structures maintained by the ISR, or in another data structure, in association with an identifier of the communication link. In this way, this characteristic information may be utilized by ISR 912 or 914 in selecting which transceivers and communication links over which to transmit information/data. For example, if a particular communication link is experiencing a large number of errors, as determined from the ECC and CRC information and a permissible threshold of errors, then that communication link may no longer be used by ISR 912 or 914 when transmitting information to the other processor chip. Instead, the other transceivers and communication links may be selected for use while eliminating the communication link and transceiver experiencing the excessive error of data traffic.

When formatting the information for transmission over communication links 906, ISR 912 or 914 augments each packet of data transmitted from processor chip 902 to processor chip 904 with header information and ECC/CRC information before being broken up into chunks that have as many bits as the number of communication links 906 currently used to communicate data from processor chip 902 to processor chip 904. ISR 912 in processor chip 902 arranges the chunks such that all bits transmitted over a particular link over some period of time include both 0's and 1's. This may be done, for example, by transmitting the 1's complement of the data instead of the original data and specifying the same in the header.

In processor chip 904, ISR 914 receives the packets and uses the CRC in the received packets to determine which bit(s) are in error. ISR 914 identifies and records the corresponding one of communication links 906 on which those bits were received. If transceivers 910 receive only 0's or 1's over one of communication links 906 over a period of time, ISR 914 may tag the corresponding transceiver as being permanently failed in its data structures. If a particular one of communication links 906 has an error rate that is higher than a predetermined, or user-specified, threshold, ISR 914 may tag that link as being temporarily error prone in its data structures. Error information of this manner may be collected and aggregated over predetermined, or user-specified, intervals.

ISR 914 may transmit the collected information periodically back to the sending processor chip 902. At the sender, ISR 912 uses the collected information to determine which of communication links 906 will be used to transmit information over the next interval.

To capture conditions where a link may be stuck at 0 or 1 for prolonged periods of times (but not permanently), transceivers 908 and 910 periodically transmit information over all of communication links 906 that exist on a particular point to point link between it and a receiving node. ISRs 912 and 914 may use the link state information sent back by transceivers 908 and 910 to recover from transient error conditions.

Again, in addition to identifying individual links between processor chips that may be in a state where they are unusable, e.g., an error state or permanent failure state, ISRs 912 and 914 of processor chips 902 and 904 select which set of links over which to communicate the information based on routing table data structures and the like. That is, there may be a set of communication links 906 for each processor chip with which a particular processor chip 902 has a direct connection. That is, there may be a set of communication links 906 for each of the L-bus, Z-bus, and D-bus links between processor chips. The particular L-bus, Z-bus, and/or D-bus link to utilize in routing the information to the next processor chip in order to get the information to an intended recipient processor chip is selected by ISRs 912 and 914 using the routing table data structures while the particular links of the selected L-bus, Z-bus, and/or D-bus that are used to transmit the data may be determined from the link characteristic information maintained by ISRs 912 and 914.

Figure 10:
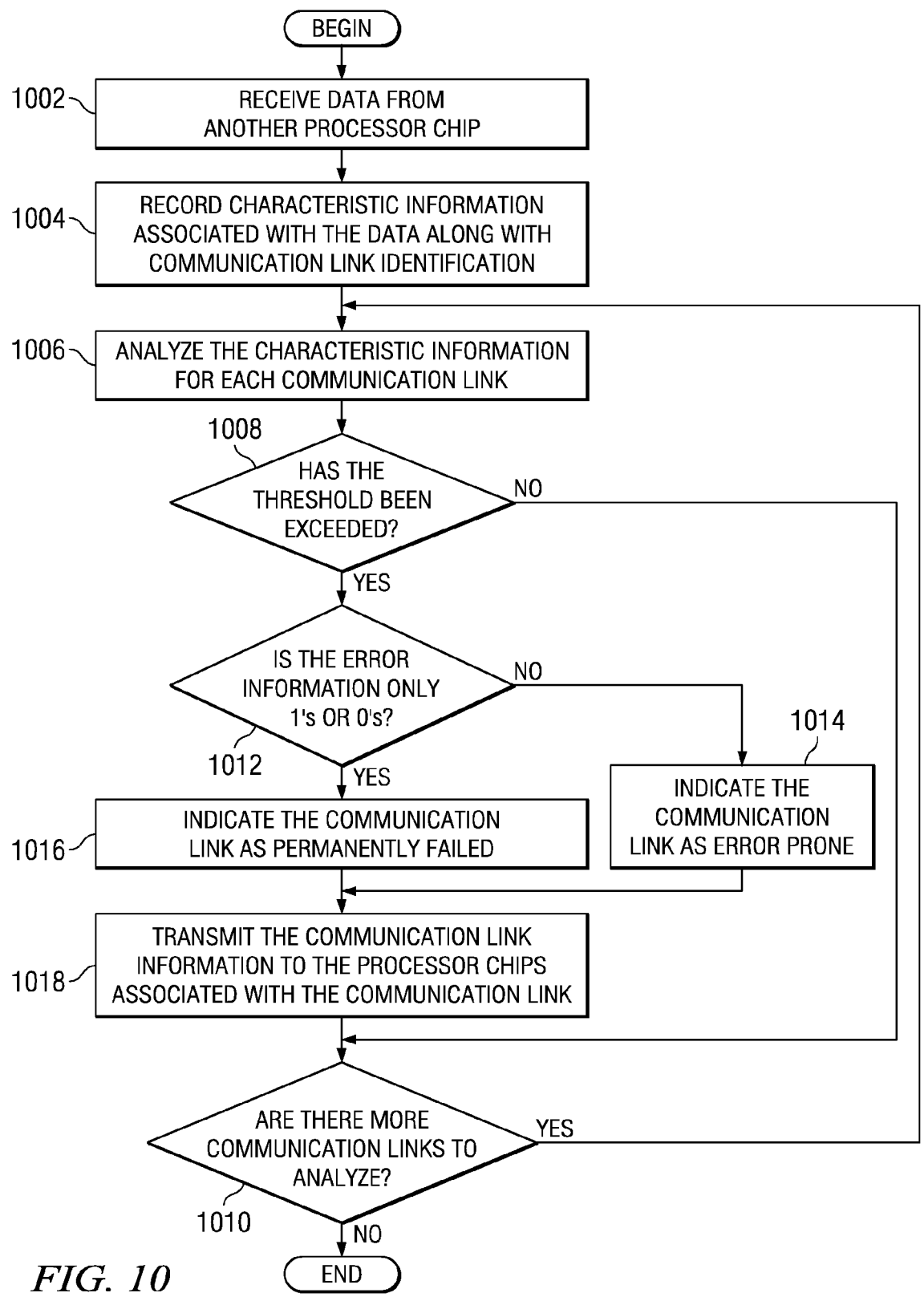
FIG. 10 depicts a flow diagram of the operation performed in providing a reliability of communication between supernodes in accordance with one illustrative embodiment.

FIG. 10 depicts a flow diagram of the operation performed in providing a reliability of communication between supernodes in accordance with one illustrative embodiment. As the operation begins, a transceiver, such as transceiver 908 of FIG. 9, of a processor chip receives data from another processor chip over a communication link (step 1002). The ISR associated with the received processor chip retains the characteristic information of the particular one of communication links on which the transceiver receives information from the other processor chip (step 1004). The ISR analyzes the characteristic information associated with each communication link in order to ascertain the reliability of each communication link (step 1006). Using the analyzed information, the ISR determines if a threshold has been exceeded (1008). If at step 1008 a predetermined threshold has not been exceeded, then the ISR determines if there are more communication links to analyze (step 1010). If at step 1010 the ISR determines there are more communication links to analyze, the operation returns to step 1006. If at step 1010 the ISR determines there are no more communication links to analyze, the operation terminates.

If at step 1008 a threshold has been exceeded, then the ISR determines if the error information associated with the communication link is comprised of only 1's or 0's (step 1012). If at step 1012 the error information is not comprised of only 1's or 0's, then the ISR indicates the communication link as error prone (step 1014). If at step 1012 the error information is comprised of only 1's or 0's, the ISR indicates the communication link as permanently failed (step 1016). From steps 1014 and 1016, the ISR transmits the communication link indication information to the processor chips associated with the indicated communication link (step 1018), with the operation proceeding to step 1010 thereafter.

Thus, in addition to identifying individual links between processor chips that may be in a state where they are unusable, the ISR of the processor chip may select which set of links over which to communicate the information based on routing table data structures and the like. While the ISR utilizes routing table data structures to select the particular link to utilize in routing the information to the next processor chip in order to get the information to an intended recipient processor chip, the particular link that is used to transmit the data may be determined from the link characteristic information maintained by the ISR.

Figure 11A:
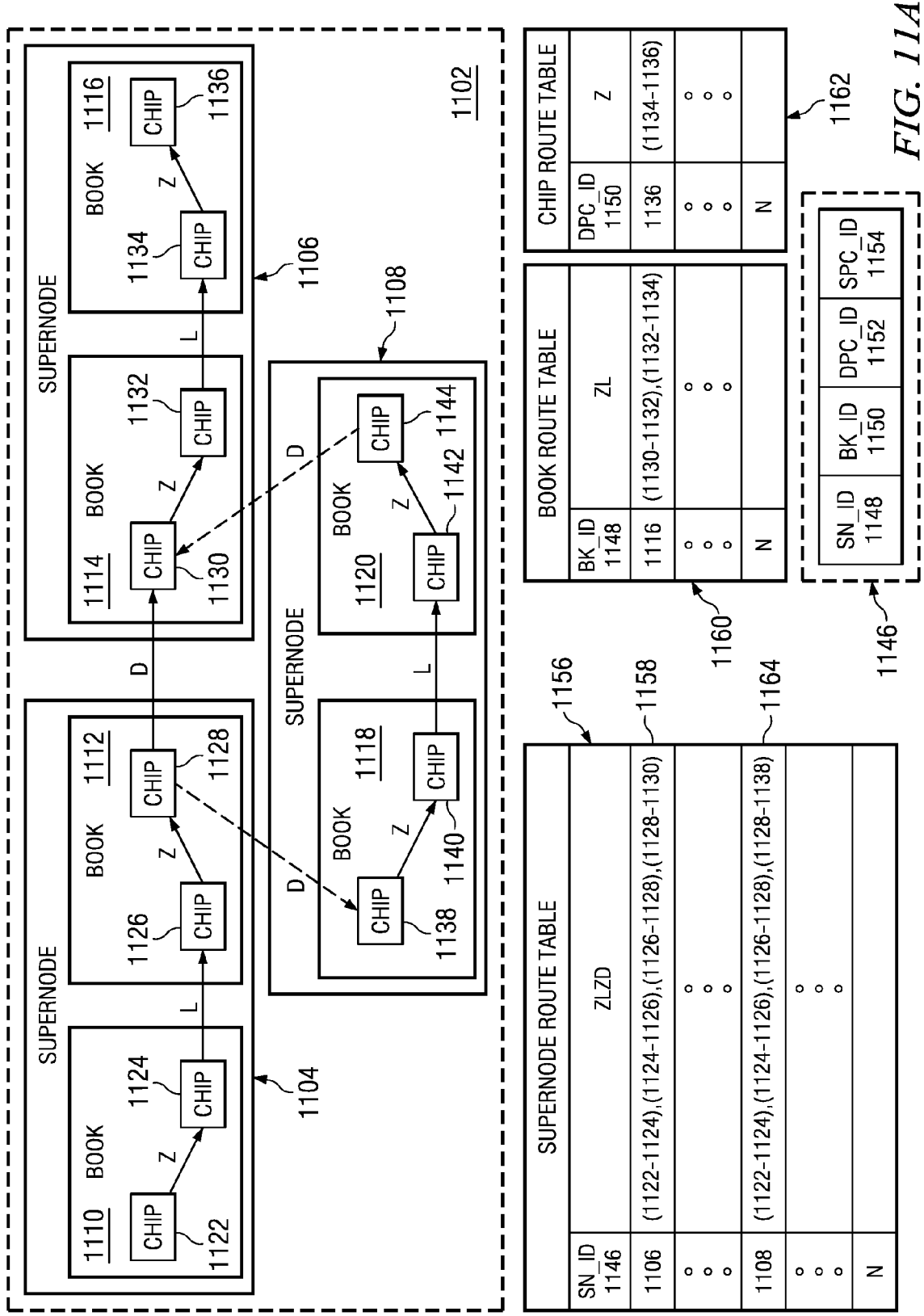
FIG. 11A depicts an exemplary method of integrated switch/routers (ISRs) utilizing routing information to route data through a multi-tiered full-graph interconnect architecture network in accordance with one illustrative embodiment.

FIG. 11A depicts an exemplary method of ISRs utilizing routing information to route data through a multi-tiered full-graph interconnect architecture network in accordance with one illustrative embodiment. In the example, routing of information through a multi-tiered full-graph (MTFG) interconnect architecture, such as MTFG interconnect architecture 500 of FIG. 5, may be performed by each ISR of each processor chip on a hop-by-hop basis as the data is transmitted from one processor chip to the next in a selected communication path from a source processor chip to a target recipient processor chip. As shown in FIG. 11A, and similar to the depiction in FIG. 5, MTFG interconnect architecture 1102 includes supernodes (SNs) 1104, 1106, and 1108, processor books (BKs) 1110-1120, and processor chips (PCs) 1122-1144. In order to route information from PC 1122 to PC 1144 in MTFG interconnect architecture 1102, the ISRs may use a three-tiered routing table data structure topology. While this example uses a three-tiered routing table data structure topology, the illustrative embodiments recognize that other numbers of table data structures may be used to route information from one processor chip to another processor chip in MTFG interconnect architecture 1102 without departing from the spirit and scope of the present invention. The number of table data structures may be dependent upon the particular number of tiers in the architecture.

The three-tiered routing data structure topology of the illustrative embodiments includes a supernode (SN) routing table data structure which is used to route data out of a source supernode to a destination supernode, a book routing table data structure which is used to route data from one processor book to another within the same supernode, and a chip routing table data structure which is used to route data from one chip to another within the same processor book. It should be appreciated that a version of the three tiered data structure may be maintained by each ISR of each processor chip in the MTFG interconnect architecture network with each copy of the three tiered data structure being specific to that particular processor chip's position within the MTFG interconnect architecture network. Alternatively, the three tiered data structure may be a single data structure that is maintained in a centralized manner and which is accessible by each of the ISRs when performing routing. In this latter case, it may be necessary to index entries in the centralized three-tiered routing data structure by a processor chip identifier, such as a SPC_ID as discussed hereafter, in order to access an appropriate set of entries for the particular processor chip.

In the example shown in FIG. 11A, a host fabric interface (HFI) (not shown) of a source processor chip, such as HFI 338 in FIG. 3, provides an address 1146 of where the information is to be transmitted, which includes supernode identifier (SN_ID) 1148, processor book identifier (BK_ID) 1150, destination processor chip identifier (DPC_ID) 1152, and source processor chip identifier (SPC_ID) 1154. The transmission of information may originate from software executing on a core of the source processor chip. The executing software identifies the request for transmission of information that needs to be transmitted to a task executing on a particular chip in the system. The executing software identifies this information when a set of tasks that constitute a communicating parallel "job" are spawned on the system, as each task provides information that lets the software and eventually HFI 338 determine on which chip every other task is executing. The entire system follows a numbering scheme that is predetermined, such as being defined in hardware. For example, given a chip number X ranging from 0 to 65535, there is a predetermined rule to determine the supernode, the book, and the specific chip within the book that X corresponds to. Therefore, once software informs HFI 338 to transmit the information to chip number 24356, HFI 338 decomposes chip 24356 into the correct supernode, book, and chip-within-book using a rule. The rule may be as simple as: SN=floor (X/128); BOOK=floor ((X modulo 128)/16); and CHIP-WITHIN-BOOK=X modulo 8. Address 1146 may be provided in the header information of the data that is to be transmitted so that subsequent ISRs along the path from the source processor chip to the destination processor chip may utilize the address in determining how to route the data. For example, portions of address 1146 may be used to compare to routing table data structures maintained in each of the ISRs to determine the next link over which data is to be transmitted.

It should be appreciated that SPC_ID 1154 is not needed for routing the data to the destination processor chip, as illustrated hereafter, since each of the processor chip's routing table data structures are indexed by destination identifiers and thus, all entries would have the same SPC_ID 1154 for the particular processor chip with which the table data structure is associated. However, in the case of a centralized three tiered routing table data structure, SPC_ID 1154 may be necessary to identify the particular subset of entries used for a particular source processor chip. In either case, whether SPC_ID 1154 is used for routing or not, SPC_ID 1154 is included in the address in order for the destination processor chip to know where responses should be directed when or after processing the received data from the source processor chip.

In routing data from a source processor chip to a destination processor chip, each ISR of each processor chip that receives the data for transmission uses a portion of address 1146 to access its own, or a centralized, three-tiered routing data structure to identify a path for the data to take. In performing such routing, the ISR of the processor chip first looks to SN_ID 1148 of the destination address to determine if SN_ID 1148 matches the SN_ID of the current supernode in which the processor chip is present. The ISR receives the SN_ID of its associated supernode at startup time from the software executing on the processor chip associated with the ISR, so that the ISR may use the SN_ID for routing purposes. If SN_ID 1148 matches the SN_ID of the supernode of the processor chip that is processing the data, then the destination processor chip is within the current supernode, and so the ISR of that processor chip compares BK_ID 1150 in address 1146 to the BK_ID of the processor book associated with the present processor chip processing the data. If BK_ID 1150 in address 1146 matches the BK_ID associated with the present processor chip, then the processor chip checks DPC_ID 1152 to determine if DPC_ID 1152 matches the processor chip identifier of the present processor chip processing the data. If there is a match, the ISR supplies the data through the HFI associated with the processor chip DPC_ID, which processes the data.

If at any of these checks, the respective ID does not match the corresponding ID associated with the present processor chip that is processing the data, then an appropriate lookup in a tier of the three-tiered routing table data structure is performed. Thus, for example, if SN_ID 1148 in address 1146 does not match the SN_ID of the present processor chip, then a lookup is performed in supernode routing table data structure 1156 based on SN_ID 1148 to identify a pathway for routing the data out of the present supernode and to the destination supernode, such as via a pathway comprising a particular set of ZLZD-bus communication links.

If SN_ID 1148 matches the SN_ID of the present processor chip, but BK_ID 1150 does not match the BK_ID of the present processor chip, then a lookup operation is performed in processor book routing table data structure 1160 based on BK_ID 1150 in address 1146. This lookup returns a pathway within a supernode for routing the data to a destination processor book. This pathway may comprise, for example, a set of Z-bus and L-bus links for transmitting the data to the appropriate processor book.

If both SN_ID 1148 and BK_ID 1150 match the respective IDs of the present processor chip, then the destination processor chip is within the same processor book as the present processor chip. If DPC_ID 1152 does not match the processor chip identifier of the present processor chip, then the destination processor chip is a different processor chip with in the same processor book. As a result, a lookup operation is performed using processor chip routing table data structure 1162 based on DPC_ID 1152 in address 1146. The result is a Z-bus link over which the data should be transmitted to reach the destination processor chip.

FIG. 11A illustrates exemplary supernode (SN) routing table data structure 1156, processor book routing table data structure 1160, and processor chip routing table data structure 1162 for the portions of the path where these particular data structures are utilized to perform a lookup operation for routing data to a destination processor chip. Thus, for example, SN routing table data structure 1156 is associated with processor chip 1122, processor book routing table data structure 1160 is associated with processor chip 1130, and processor chip routing table data structure 1162 is associated with processor chip 1134. It should be appreciated that in one illustrative embodiment, each of the ISRs of these processor chips would have a copy of all three types of routing table data structures, specific to the processor chip's location in the MTFG interconnect architecture network, however, not all of the processor chips will require a lookup operation in each of these data structures in order to forward the data along the path from source processor chip 1122 to destination processor chip 1136.

As with the example in FIGS. 4A and 4B, in a MTFG interconnect architecture that contains a large number of buses connecting supernodes, e.g., 512 D-buses, supernode (SN) routing table data structures 1156 would include a large number of entries, e.g., 512 entries for the example of FIGS. 4A and 4B. The number of options for the transmission of information from, for example, processor chip 1122 to SN 1106 depends on the number of connections between processor chip 1122 to SN 1106. Thus, for a particular SN_ID 1148 in SN routing table data structure 1156, there may be multiple entries specifying different direct paths for reaching supernode 1106 corresponding to SN_ID 1148. Various types of logic may be used to determine which of the entries to use in routing data to supernode 1106. When there are multiple direct paths from supernode 1104 to supernode 1106, logic may take into account factors when selecting a particular entry/route from SN routing table data structure 1156, such as the ECC and CRC error rate information obtained as previously described, traffic levels, etc. Any suitable selection criteria may be used to select which entry in SN routing table data structure 1156 is to be used with a particular SN_ID 1148.

In a fully provisioned MTFG interconnect architecture system, there will be one path for the direct transmission of information from a processor chip to a specific SN. With SN_ID 1148, the ISR may select the direct route or any indirect route to transmit the information to the desired location using SN routing table data structure 1156. The ISR may use any number of ways to choose between the available routes, such as random selection, adaptive real-time selection, round-robin selection, or the ISR may use a route that is specified within the initial request to route the information. The particular mechanism used for selecting a route may be specified in logic provided as hardware, software, or any combination of hardware and software used to implement the ISR.

In this example, the ISR of processor chip 1122 selects route 1158 from supernode route table data structure 1156, which will route the information from processor chip 1122 to processor chip 1130. In routing the information from processor chip 1122 to processor chip 1130, the ISR of processor chip 1122 may append the selected supernode path information to the data packets being transmitted to thereby identify the path that the data is to take through supernode 1104. Each subsequent processor chip in supernode 1104 may see that SN_ID 1148 for the destination processor chip does not match its own SN_ID and that the supernode path field of the header information is populated with a selected path. As a result, the processor chips know that the data is being routed out of current supernode 1104 and may look to a supernode counter maintained in the header information to determine the current hop within supernode 1104.

For example, in the depicted supernode 1104, there are 4 hops from processor chip 1122 to processor chip 1130. The supernode path information similarly has 4 hops represented as ZLZD values. The supernode counter may be incremented with each hop such that processor chip 1124 knows based on the supernode counter value that it is the second hop along the supernode path specified in the header information. As a result, it can retrieve the next hop from the supernode path information in the header and forward the data along this next link in the path. In this way, once source processor chip 1122 sets the supernode path information in the header, the other processor chips within the same supernode need not perform a SN routing table data structure 1156 lookup operation. This increases the speed at which the data is routed out of source supernode 1104.

When the data packets reach processor chip 1130 after being routed out of supernode 1104 along the D-bus link to processor chip 1130, the ISR of processor chip 1130 performs a comparison of SN_ID 1148 in address 1146 with its own SN_ID and, in this example, determines that they match. As a result, the ISR of the processor chip 1130 does not look to the supernode path information but instead looks to a processor book path information field to determine if a processor book path has been previously selected for use in routing data through the processor book of processor chip 1130.

In the present case, processor chip 1130 is the first processor in the processor book 1114 to receive the data and thus, a processor book path has not already been selected. Thus, processor chip 1130 performs a comparison of BK_ID 1150 from address 1146 with its own BK_ID. In the depicted example, BK_ID 1150 will not match the BK_ID of processor chip 1130 since the data is not destined for a processor chip in the same processor book as processor chip 1130. As a result, the ISR of processor chip 1130 performs a lookup operation in its own processor book routing table data structure 1160 to identify and select a ZL path to route the data out of the present processor book to the destination processor book. This ZL path information may then be added to the processor book path field of the header information such that subsequent processor chips in the same processor book will not need to perform the lookup operation and may simply route the data along the already selected ZL path. In this example, it is not necessary to use a processor book counter since there are only two hops, however in other architectures it may be necessary or desirable to utilize a processor book counter similar to that of the supernode counter to monitor the hops along the path out of the present processor book. In this way, processor chip 1130 determines the route that will get the information/data packets from processor chip 1130 in processor book 1114 to processor book 1116.

Processor book routing table data structure 1160 includes routing information for every processor chip in processor book 1114 to every other processor book within the same supernode 1106. Processor book routing table data structure 1160 may be generic, in that the position of each processor chip to every other processor chip within a processor book and each processor book to every other processor book in a supernode is known by the ISRs. Thus, processor book route table 1160 may be generically used within each supernode based on the position of the processor chips and processor books, rather to specific identifiers as used in this example.

As with the example in FIGS. 4A and 4B, in a MTFG interconnect architecture that contains 16 L-buses per book, processor book routing table data structure 1160 would include 16 entries. Thus, processor book routing table data structure 1160 would include only one option for the transmission of information from processor chip 1130 to processor book 1116. However, depending on the number of virtual channels that are available, the ISR may also have a number of indirect paths from which to choose at the L-bus level. While the previously described exemplary pseudocode provides for only one indirect route using only one of the Z-buses, L-buses, or D-buses, other routing algorithms may be used that provides for multiple indirect routing using one or more Z-buses, L-buses, and D-buses. When processor chip 1134 receives the information/data packets, the ISR of the processor chip 1134 checks SN_ID 1148 of address 1146 and determines that SN_ID 1148 matches its own associated SN_ID. The ISR of processor chip 1134 then checks BK_ID 1150 in address 1146 and determines that BK_ID 1150 matches its own associated BK_ID. Thus, the information/data packets are destined for a processor chip in the same supernode 1106 and processor book 1116 as processor chip 1134. As a result, the ISR of processor chip 1134 checks DPC_ID 1152 of address 1146 against its own processor chip identifier and determines that the two do not match. As a result, the ISR of processor chip 1134 performs a lookup operation in processor chip routing table data structure 1162 using DPC_ID 1152. The resulting Z path is then used by the ISR to route the information/data packets to the destination processor chip 1136.

Processor chip routing table data structure 1162 includes routing for every processor chip to every other processor chip within the same processor book. As with processor book route table data structure 1160, processor chip routing table data structure 1162 may also be generic, in that the position of each processor chip to every other processor chip within a processor book is known by the ISRs. Thus, processor chip routing table data structure 1162 may be generically used within each processor book based on the position of the processor chips, as opposed to specific identifiers as used in this example.

As with the example in FIGS. 4A and 4B, in a MTFG interconnect architecture that contains 7 Z-buses, processor chip routing table data structure 1162 would include 8 entries. Thus, processor chip routing table data structure 1162 would include only one option for the transmission of information from processor chip 1134 to processor chip 1136. Alternatively, in lieu of the single direct Z path, the ISR may choose to use indirect routing at the Z level. Of course, the ISR will do so only if the number of virtual channels are sufficient to avoid the possibility of deadlock. In certain circumstances, a direct path from one supernode to another supernode may not be available. This may be because all direct D-buses are busy, incapacitated, or the like, making it necessary for an ISR to determine an indirect path to get the information/data packets from SN 1104 to SN 1106. For instance, the ISR of processor chip 1122 could detect that a direct path is temporarily busy because the particular virtual channel that it must use to communicate on the direct route has no free buffers into which data can be inserted. Alternatively, the ISR of processor chip 1122 may also choose to send information over indirect paths so as to increase the bandwidth available for communication between any two end points. As with the above example, the HFI of the source processor provides the address of where the information is to be transmitted, which includes supernode identifier (SN_ID) 1148, processor book identifier (BK_ID) 1150, destination processor chip identifier (DPC_ID) 1152, and source processor chip identifier (SP-C_ID) 1154. Again, the ISR uses the SN_ID 1148 to reference the supernode routing table data structure 1156 to determine a route that will get the information from processor chip 1122 to supernode (SN) 1106.

However, in this instance the ISR may determine that no direct routes are available, or even if available, should be used (due to, for example, traffic reasons or the like). In this instance, the ISR would determine if a path through another supernode, such as supernode 1108, is available. For example, the ISR of processor chip 1122 may select route 1164 from supernode routing table data structure 1156, which will route the information from processor chips 1122, 1124, and 1126 to processor chip 1138. The routing through supernode 1104 to processor chip 1138 in supernode 1108 may be performed in a similar manner as described previously with regard to the direct route to supernode 1106. When the information/data packets are received in processor chip 1138, a similar operation is performed where the ISR of processor chip 1138 selects a path from its own supernode routing table data structure to route the information/data from processor chip 1138 to processor chip 1130. The routing is then performed in a similar way as previously described between processor chip 1122 and processor chip 1130.

The choice to use a direct route or indirect route may be software determined, hardware determined, or provided by an administrator. Additionally, the user may provide the exact route or may merely specify direct or indirect, and the ISR of the processor chip would select from the direct or indirect routes based on such a user defined designation. It should be appreciated that it is desirable to minimize the number of times an indirect route is used to arrive at a destination processor chip, or its length, so as to minimize latency due to indirect routing. Thus, there may be an identifier added to header information of the data packets identifying whether an indirect path has been already used in routing the data packets to their destination processor chip. For example, the ISR of the originating processor chip 1122 may set this identifier in response to the ISR selecting an indirect routing option. Thereafter, when an ISR of a processor chip is determining whether to use a direct or indirect route to transmit data to another supernode, the setting of this field in the header information may cause the ISR to only consider direct routes.

Alternatively, this field may constitute a counter which is incremented each time an ISR in a supernode selects an indirect route for transmitting the data out of the supernode. This counter may be compared to a threshold that limits the number of indirect routes that may be taken to arrive at the destination processor chip, so as to avoid exhausting the number of virtual channels that have been pre-allocated on the path.

FIG. 11B is a flowchart outlining an exemplary operation for selecting a route based on whether or not the data has been previously routed through an indirect route to the current processor, in accordance with one illustrative embodiment. The operation outlined in FIG. 11B may be performed, for example, within a ISR of a processor chip, either using hardware, software, or any combination of hardware and software within the ISR. It should be noted that in the following discussion of FIG. 11B, "indirect" and "direct" are used in regard to the D-buses, i.e. buses between supernodes.

As shown in FIG. 11B, the operation starts with receiving data having header information with an indirect route identifier and an optional indirect route counter (step 1182). The header information is read (step 1184) and a determination is made as to whether the indirect route identifier is set (step 1186). As mentioned above, this identifier may in fact be a counter in which case it can be determined in step 1186 whether the counter has a value greater than 0 indicating that the data has been routed through at least one indirect route.

If the indirect route identifier is set, then a next route for the data is selected based on the indirect route identifier being set (step 1188). If the indirect route identifier is not set, then the next route for the data is selected based on the indirect route being not set (step 1192). The data is then transmitted along the next route (step 1190) and the operation terminates. It should be appreciated that the above operation may be performed at each processor chip along the pathway to the destination processor chip, or at least in the first processor chip encountered in each processor book and/or supernode along the pathway.

In step 1188 certain candidate routes or pathways may be identified by the ISR for transmitting the data to the destination processor chip which may include both direct and indirect routes. Certain ones of these routes or pathways may be excluded from consideration based on the indirect route identifier being set. For example, the logic in the ISR may specify that if the data has already been routed through an indirect route or pathway, then only direct routes or pathways may be selected for further forwarding of the data to its destination processor chip. Alternatively, if an indirect route counter is utilized, the logic may determine if a threshold number of indirect routes have been utilized, such as by comparing the counter value to a predetermined threshold, and if so, only direct routes may be selected for further forwarding of the data to its destination processor chip. If the counter value does not meet or exceed that threshold, then either direct or indirect routes may be selected.

Thus, the benefits of using a three-tiered routing table data structure topology is that only one 512 entry supernode route table, one 16 entry book table, and one 8 entry chip table lookup operation are required to route information across a MTFG interconnect architecture. Although the illustrated table data structures are specific to the depicted example, the processor book routing table data structure and the processor chip routing table data structure may be generic to every group of books in a supernode and group of processor chips in a processor book. The use of the three-tiered routing table data structure topology is an improvement over known systems that use only one table and thus would have to have a routing table data structure that consists of 65,535 entries to route information for a MTFG interconnect architecture, such as the MTFG interconnect architecture shown in FIGS. 4A and 4B, and which would have to be searched at each hop along the path from a source processor chip to a destination processor chip. Needless to say, in a MTFG interconnect architecture that consists of different levels, routing will be accomplished through correspondingly different numbers of tables.

Figure 12:
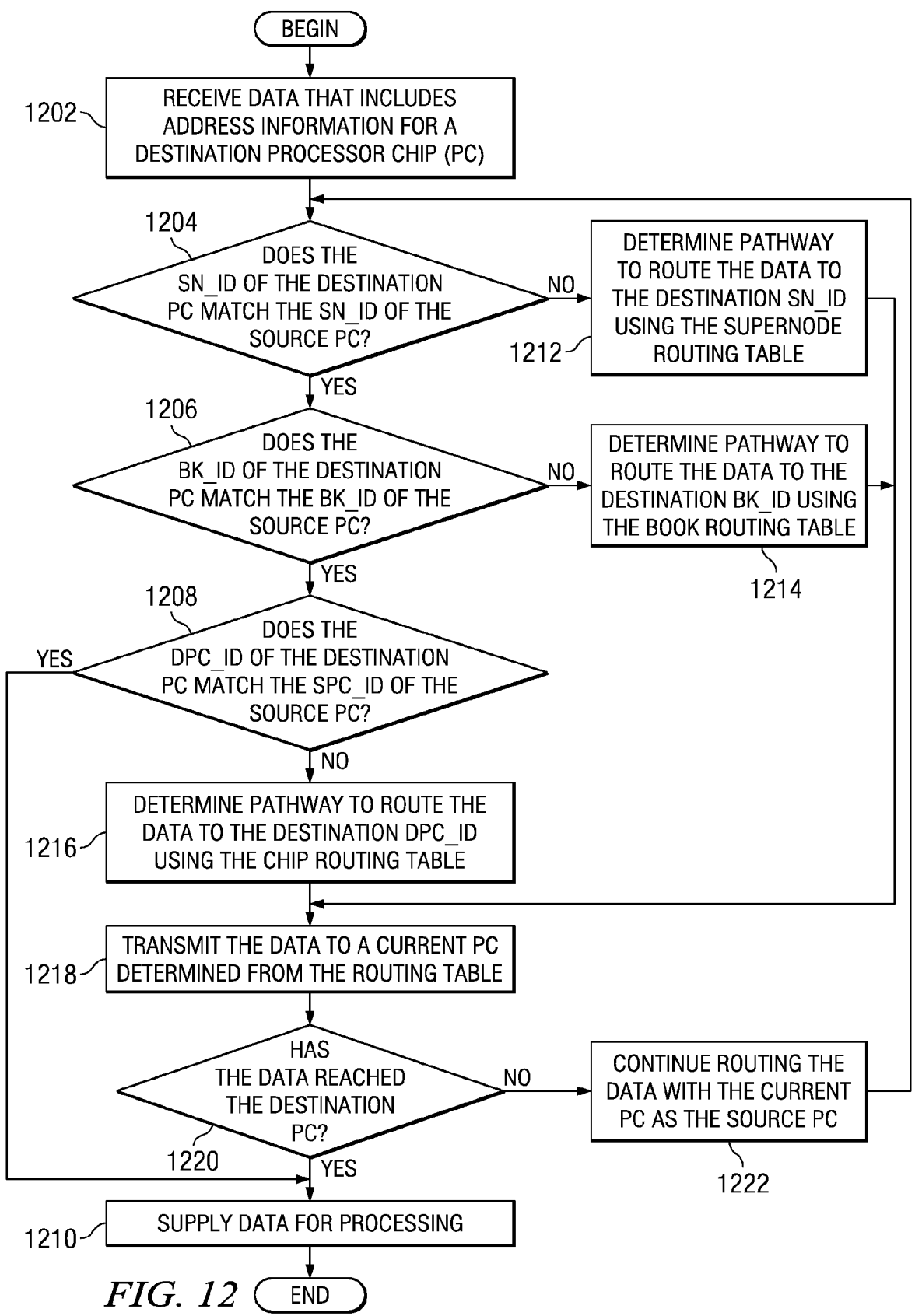
FIG. 12 depicts a flow diagram of the operation performed to route data through a multi-tiered full-graph interconnect architecture network in accordance with one illustrative embodiment.

FIG. 12 depicts a flow diagram of the operation performed to route data through a multi-tiered full-graph interconnect architecture network in accordance with one illustrative embodiment. In the flow diagram the routing of information through a multi-tiered full-graph (MTFG) interconnect architecture may be performed by each ISR of each processor chip on a hop-by-hop basis as the data is transmitted from one processor chip to the next in a selected communication path from a source processor chip to a target recipient processor chip. As the operation begins, an ISR receives data that includes address information for a destination processor chip (PC) from a host fabric interface (HFI), such as HFI 338 in FIG. 3 (step 1202). The data provided by the HFI includes an address of where the information is to be transmitted, which includes a supernode identifier (SN_ID), a processor book identifier (BK_ID), a destination processor chip identifier (DPC_ID), and a source processor chip identifier (SPC_ID). The ISR of the PC first looks to the SN_ID of the destination address to determine if the SN_ID matches the SN_ID of the current supernode in which the source processor chip is present (step 1204). If at step 1204 the SN_ID matches the SN_ID of the supernode of the source processor chip that is processing the data, then the ISR of that processor chip compares the BK_ID in the address to the BK_ID of the processor book associated with the source processor chip processing the data (step 1206). If at step 1206 the BK_ID in the address matches the BK_ID associated with the source processor chip, then the processor chip checks the DPC_ID to determine if the DPC_ID matches the processor chip identifier of the source processor chip processing the data (step 1208). If at step 1208 there is a match, then the source processor chip processes the data (step 1210), with the operation ending thereafter.

If at step 1204 the SN_ID fails to match the SN_ID of the supernode of the source processor chip that is processing the data, then the ISR references a supernode routing table to determine a pathway to route the data out of the present supernode to the destination supernode (step 1212). Likewise, if at step 1206 the BK_ID in the address fails to match the BK_ID associated with the source processor chip, then the ISR references a processor book routing table data structure to determine a pathway within a supernode for routing the data to a destination processor book (step 1214). Likewise, if at step 1208 the DPC_ID fails to match the SPC_ID of the source processor chip, then the ISR reference a processor chip routing table data structure to determine a pathway to route the data from the source processor chip to the destination processor chip (step 1216).

From steps 1212, 1214, or 1216, once the pathway to route the data from the source processor chip to the respective supernode, book, or processor chip is determined, the ISR transmits the data to a current processor chip along the identified pathway (step 1218). Once the ISR completes the transmission, the ISR where the data now resides determines if the data has reached the destination processor chip by comparing the current processor chip's identifier to the DPC_ID in the address of the data (step 1220). If at step 1220 the data has not reached the destination processor chip, then the ISR of the current processor chip where the data resides, continues the routing of the data with the current processor chip's identifier used as the SPC_ID (step 1222), with the operation proceeding to step 1204 thereafter. If at step 1220 the data has reached the destination processor chip, then the operation proceeds to step 1210.

Thus, using a three-tiered routing table data structure topology that comprises only one 512 entry supernode route table, one 16 entry book table, and one 8 entry chip table lookup to route information across a MTFG interconnect architecture improves over known systems that use only one table that consists of 65,535 entries to route information.

FIG. 13 depicts an exemplary supernode routing table data structure that supports dynamic selection of routing within a multi-tiered full-graph interconnect architecture using no-direct and no-indirect fields in accordance with one illustrative embodiment. In addition to the example described in FIG. 9, where one or more optical fibers or wires for a port may be unavailable and, thus, the port may perform at a reduced capacity, there may also be instances where for one or more of the ports or the entire bus, either Z-bus, D-bus, or L-bus, may not be available. Again, this may be due to instances during manufacturing, shipping, usage, adjustment, or the like, where the one or more optical fibers or wires may end up broken or otherwise unusable. In such an event, the supernode (SN) routing table data structure, the processor book routing table data structure, and the processor chip routing table data structure, such as SN routing table data structure 1156, processor book routing table data structure 1160, and processor chip routing table data structure 1162 of FIG. 11A, may require updating so that an ISR, such as integrated switch/router 338 of FIG. 3, will not use a route that includes the broken or unusable bus.

For example, SN routing table data structure 1302 may include fields that indicate if the specific route may be used as a direct or an indirect route. No direct route (NDR) indicator 1304 and no indirect route (NIDR) indicator 1306 may be used by the ISR in selecting an appropriate route to route information through the multi-tiered full-graph (MTFG) interconnect architecture network. NDR indicator 1304 may be used to specify whether a particular direct route from a given chip to a specific SN is available. For instance, if any of the links comprising the route entry 1308 are unavailable, or there is a significant enough degradation in availability of links, then the corresponding NDR indicator 1304 entry may be set.

The NIDR indicator 1306 entry indicates whether a particular path may be used for indirect routing of information/data packets. This NIDR indicator 1306 may be set in response to a link in the path becoming unavailable or there is a significant enough degradation in availability of the links, for example. In general, if a pathway cannot be used for direct routing, it will generally not be available for indirect routing. However, there are some cases where a path may be used for direct routing and not for indirect routing. For example, if the availability of a link in the path is degraded, but not made completely unavailable, the path may be permitted to be used for direct routing but not indirect routing. This is because the additional latency due to the degraded availability may not be so significant as to make the path unusable for direct routing but it would create too much latency in an indirect path which already incurs additional latency by virtue of it being an indirect routing. Thus, it is possible that the bits in NIDR indicator 1306 may be set while the bits in the NDR indicator 1304 are not set.

The NIDR indicator 1306 may also come into use because of a determined longest route that can be taken in the multi-tiered hierarchical interconnect. Consider an indirect path from processor chip 1122 to processor chip 1136 in FIG. 11A that consists of the following hops: 1122→1124→1126→1128→1138→1140→1142→1144→1130→1132→1134→1136. If the part of the route from SN 1108 to SN 1106 is not available, such as the hop 1140→1142, then processor chip 1122 needs to know this fact, which, for example, is indicated by indicator 1312 in NIDR indicator 1306 field. Processor chip 1122 benefits from knowing this fact because of potential limitations in the number of virtual channels that are available causing a packet destined for SN 1106 that is routed to SN 1108 to only be routed over the single direct route from SN 1108 to SN 1106. Consequently, if any direct route from SN 1108 to any other SN is not available, then the entries in all the SN routing table data structures that end in supernode 1108 will have the corresponding NIDR indicator 1306 field set.

NIDR indicator 1306 may also be set up to contain more than one bit. For instance, NIDR indicator 1306 may contain multiple bits where each bit pertains to a specific set of direct routes from the destination SN identifier field, such as SN_ID 1148 of FIG. 11A, to all other SNs.

In order to determine if a specific route is not available, the ISR may attempt to transmit information over the route a number of predetermined times. The ISR may increment a counter each time a packet of information is dropped. Based on the value of the counter meeting a predetermined value, the ISR may set either or both of NDR indicator 1304 or NIDR indicator 1306 fields to a value that indicates the specific route is not to be used as a path for transmitting information. The predetermined value may be determined by an administrator, a preset value, or the like. NIDR indicator 1306 may also be set by an external software entity such as network management software.

In determining if a route is not available, the ISR may narrow a larger path, such as those in route 1314, to determine the specific bus that is broken. For example, in route 1308 there may only be one bus of the four buses in the route that is broken. Once the ISR determines the specific broken bus, such as exemplary bus 1310, the ISR may update NDR indicator 1304 or NIDR indicator 1306 fields for each route in supernode routing table data structure 1302 to indicate that each route that includes the specific bus may not be used for a direct or indirect path. In this case, the ISR may also update route 1316 as it also includes bus 1310. Although not depicted, the ISR may update similar fields in the processor book routing table and processor chip routing table data structures to indicate that each route that includes the specific bus may not be used for a direct or indirect path.

Thus, using NDR indicator 1304 or NIDR indicator 1306 fields in conjunction with supernode routing table data structure 1302 provides for a more efficient use of the three-tier route table topology based on detected broken or unusable communication connections. That is, using NDR indicator 1304 or NIDR indicator 1306 fields ensures that only functioning routes in the MTFG interconnect architecture network are used, thereby improving the performance of the ISRs and the information/data packet routing operations.

Figure 14A:
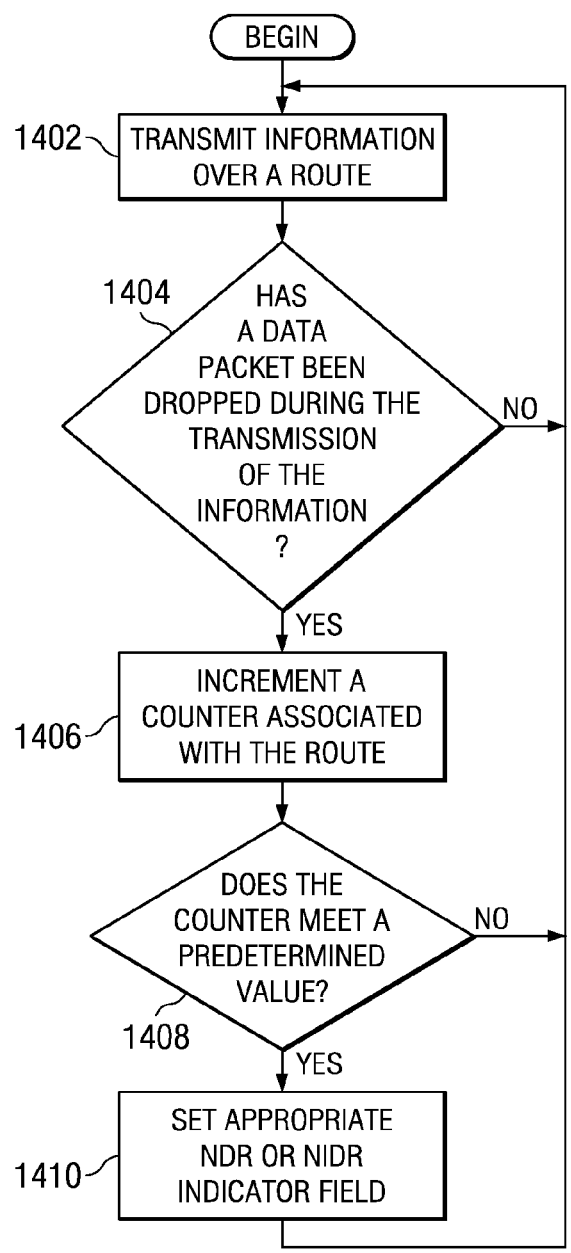
FIG. 14A depicts a flow diagram of the operation performed in supporting the dynamic selection of routing within a multi-tiered full-graph interconnect architecture using no-direct and no-indirect fields in accordance with one illustrative embodiment.

FIG. 14A depicts a flow diagram of the operation performed in supporting the dynamic selection of routing within a multi-tiered full-graph interconnect architecture using no-direct and no-indirect fields in accordance with one illustrative embodiment. As the operation begins, an ISR attempts to transmit information over a route (step 1402). The ISR determines if any packet of information is dropped during the transmission of the data (step 1404). If at step 1404 no data packet has been dropped, the operation returns to step 1402. If at step 1404 a data packet has been dropped during the transmission of data, the ISR increments a value of a counter for the particular route (step 1406). The ISR then determines if the value of the counter meets or exceeds a predetermined value (step 1408). If at step 1408 the value of the counter has not met or exceeded the predetermined value, then the operation returns to step 1402. If at step 1408 the value of the counter has met or exceeded the predetermined value, the ISR sets either or both of the NDR indicator or the NIDR indicator fields to a value that indicates the specific route is not to be used as a path for transmitting information (step 1410), with the operation returning to step 1402 thereafter. Furthermore, the ISR may inform other ISRs in the system to amend their routing tables or may inform network management software which may in turn inform other ISRs to amend their routing tables.

Thus, using the NDR indicator or NIDR indicator fields in conjunction with a supernode routing table data structure provides for a more efficient use of the three-tiered routing table data structure topology based on detected broken or unusable communication connections.

Figure 14B:
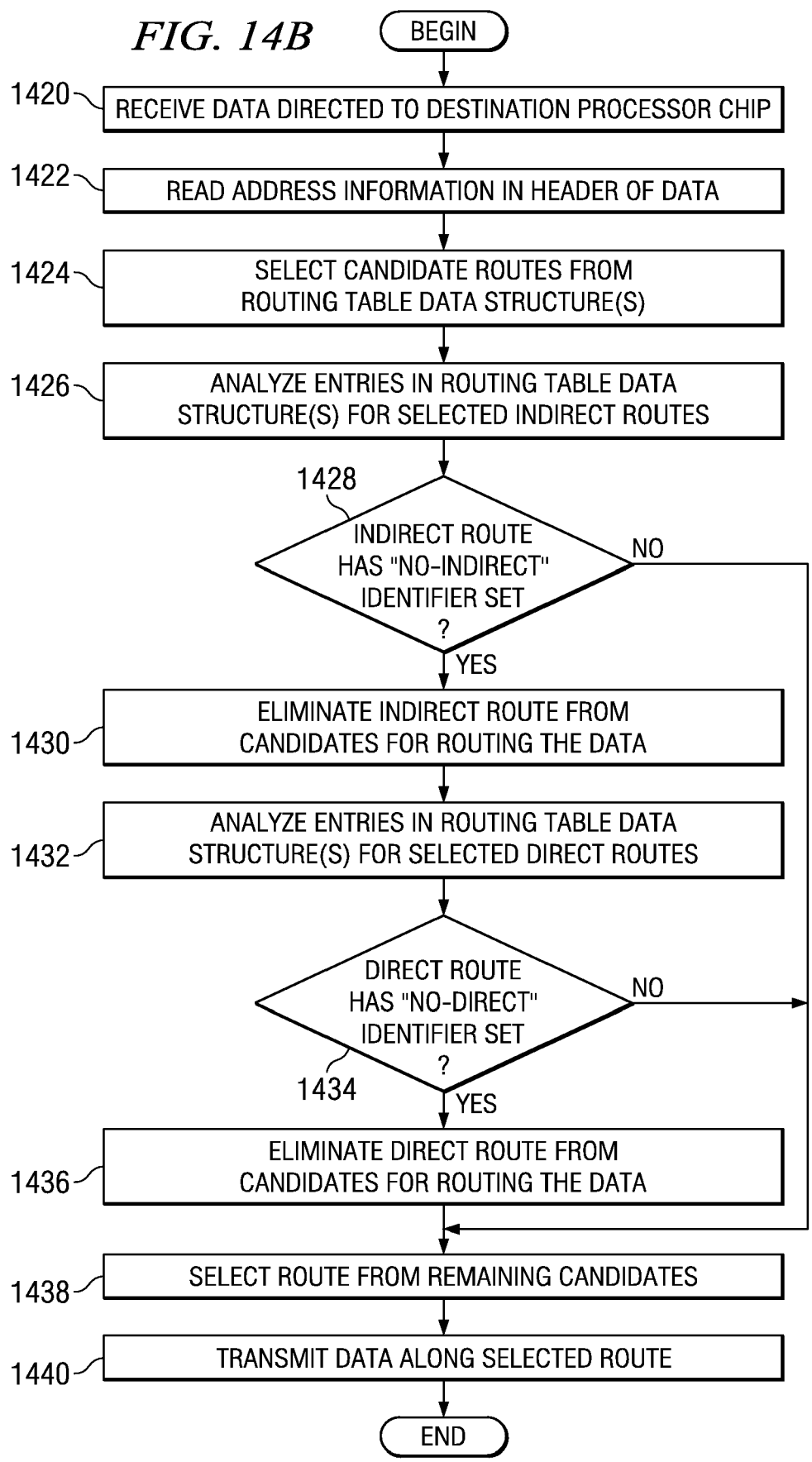
FIG. 14B outlines an exemplary operation for selecting a route for transmitting data based on whether or not a no-direct or no-indirect indicator is set in accordance with one illustrative embodiment.

FIG. 14B outlines an exemplary operation for selecting a route for transmitting data based on whether or not a no-direct or no-indirect indicator is set in accordance with one illustrative embodiment. The operation outlined in FIG. 14B may be performed, for example, within an ISR of a processor chip, either using hardware, software, or any combination of hardware and software within the ISR.

As shown in FIG. 14B, the operation starts with receiving data having directed to a destination processor chip (step 1420). The address information in the header information of the data is read (step 1422) and based on the address information, candidate routes for routing the data to the destination processor chip are selected from one or more routing table data structures (step 1424). For each indirect route in the selected candidates, the entries in the one or more routing table data structures are analyzed to determine if their "no-indirect" identifiers are set (step 1426). If an indirect route has an entry having the "no-indirect" identifier set (step 1428), then that indirect route is eliminated as a candidate for routing the data (step 1430).

For each of the direct routes in the selected candidates, the entries in the one or more routing table data structures are analyzed to determine if their "no-direct" identifiers are set (step 1432). If a direct route has an entry having the "no-direct" identifier set (step 1434), then that direct route is eliminated as a candidate for routing the data (step 1436). The result is a set of candidate routes in which the routes are permitted to be utilized in the manner necessary to route data from the current processor to the destination processor, i.e. able to be used as indirect or direct routes.

From the resulting subset of candidate routes, a route for transmitting the data to the destination processor chip is selected (step 1438). The data is then transmitted along the selected route toward the destination processor chip (step 1440). The operation then terminates. It should be appreciated that the above operation may be performed at each processor chip along the pathway to the destination processor chip, or at least in the first processor chip encountered in each processor book and/or supernode along the pathway.

FIG. 15 depicts an exemplary diagram illustrating a supernode routing table data structure having a last used field that is used when selecting from multiple direct routes in accordance with one illustrative embodiment. As discussed above with respect to FIG. 11A, in one illustrative embodiment, there may be as many as 512 direct routes for the transmission of information from a processor chip within one supernode to another supernode in a multi-tiered full-graph (MTFG) interconnect architecture network. This happens, for instance, if there are only two supernodes in the system (such as 1104 and 1106 from FIG. 11A), with each supernode having a total of 512 links available for connecting to the other supernode. The selection of the route may be through a random selection, an adaptive real-time selection, a round-robin selection, or the ISR may use a route that is specified within the initial request to route the information.

For example, if the ISR uses the random selection, adaptive real-time selection, or round-robin selection methods, then the ISR may also use last used field 1502 in association with supernode routing table data structure 1504 to track the route last used to route information. In selecting a route to transmit information from one supernode to another supernode, the ISR identifies all of the direct routes between the supernodes. In order to keep a fair use of the direct routes, priority table data structure 1506 may be used to hold the determined order of the routes. When the ISR attempts to select one of the direct routes, then it may identify the route that was last used from route field 1508 as indicated by last used field 1502. That is, last used field 1502 may be a bit that is set in response to the corresponding entry being selected by the ISR for use in routing the information/data packets. A previously set bit in this last used field 1502 may be reset such that only one bit in last used field 1502 for a group of possible alternative paths from the source processor chip to the destination supernode is ever set.

The entries in supernode routing table data structure 1504 may include pointer field 1510 for storing pointers to corresponding priority entries 1514 in priority table data structure 1506. The ISR, when selecting a route for use in routing information/data may identify the last used entry based on the setting of a bit in last used field 1502 and use corresponding pointer 1510 to identify priority entry 1514 in priority table data structure 1506. The corresponding priority entry 1514 in priority table data structure 1506 stores a relative priority of the entry compared to the other entries in the group of possible alternative paths from the source processor chip to the destination supernode. The priority of the previously selected route may thus be determined and, as a result, the next priority may be identified. For example, if the previously selected route has a priority of "4", then the next priority route of "5" may be selected. Alternatively, priority table data structure 1506 may be implemented as a linked list such that the next priority entry 1514 in priority table data structure 1506 may be identified by following the linked list to the next entry. Priority entries 1514 in the priority table data structure 1506 may have associated pointers 1512 for pointing back to entries in supernode routing table data structure 1504. In this way, the next priority entry in supernode routing table data structure 1504 may be identified, a corresponding bit in last used field 1502 may be set for this entry, and the previously selected entry in supernode routing table data structure 1504 may have its last used field bit reset.

In this way, routes may be selected based on a relative priority of the routes that may be defined by a user, automatically set based on detected conditions of the routes, or the like. By using a separate priority table data structure 1506 that is linked to supernode routing table data structure 1504, supernode routing table data structure 1504 may remain relatively unchanged, other than the updates to the last used field bits, while changes to priority table data structure 1506 may be made regularly based on changes in conditions of the routes, user desires, or the like.

The last used field 1502, pointer 1510, and priority table data structure 1506 may be used not only with direct routings but also with indirect routings as well. As discussed above with respect to FIG. 11A, in a multi-tiered full-graph (MTFG) interconnect architecture network there may be as many as 510 indirect routes based on the indirection at the D level for the transmission of information from a processor chip within a supernode to another supernode in the MTFG interconnect architecture network. This happens, when for instance, in a system with 512 supernodes where each supernode has 511 connections—one to every other supernode. In such a system, there will be exactly one direct route between any two supernodes, and 510 indirect routes (through the remaining 510 supernodes) that perform indirection at the D-bus level. As with the direct routings, the selection of an indirect route may be through a random selection, an adaptive real-time selection, a round-robin selection, or the router may use a route that is specified within the initial request to route the information.

For example, if the ISR uses the random selection, adaptive real-time selection, or round-robin selection methods, then the ISR may also use last used field 1502 in association with supernode routing table data structure 1504 to track the indirect route last used to route information. In selecting an indirect route to transmit information from one supernode to another supernode, the ISR identifies all of the indirect routes between the supernodes in supernode routing table data structure 1504. In order to keep a fair use of the indirect routes, priority table data structure 1506 may be used to hold the determined order of the routes as discussed above. When the ISR attempts to select one of the indirect routes, then it may identify the route that was last used from route field 1508 as indicated by last used field 1502. The corresponding pointer 1510 may then be used to reference an entry in priority table data structure 1506. The ISR then identifies the next priority route in priority table data structure 1506 and the ISR uses the corresponding pointer 1510 to reference back into supernode routing table data structure 1504 to find the entry corresponding to the next route to transmit the information. The ISR may update the bits in last used field 1502 in supernode routing table data structure 1504 to indicate the new last used route entry.

Figure 16:
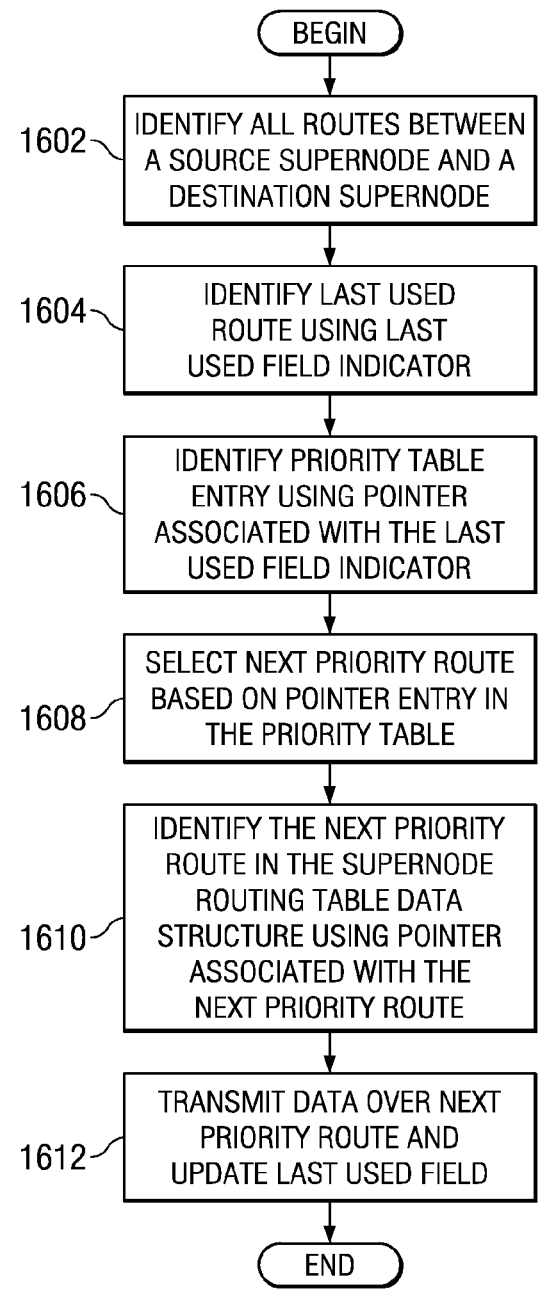
FIG. 16 depicts a flow diagram of the operation performed in selecting from multiple direct and indirect routes using a last used field in a supernode routing table data structure in accordance with one illustrative embodiment.

FIG. 16 depicts a flow diagram of the operation performed in selecting from multiple direct and indirect routes using a last used field in a supernode routing table data structure in accordance with one illustrative embodiment. The operation described in FIG. 16 is directed to direct routes, although the same operation is performed for indirect routes. As the operation begins, an ISR identifies all of the direct routes between a source supernode and a destination supernode in the supernode routing table data structure (step 1602). Once all of the routes have been determined between the source supernode and the destination supernode, the ISR identifies a route that was last used as indicated by an indicator in a last used field (step 1604). The ISR uses a pointer associated with the indicated last used route to reference a priority table and identify a priority table entry (step 1606). Using the identified priority entry in the priority table, the ISR selects the next priority route (1608). The ISR uses a pointer associated with the next priority route to identify the route in the supernode routing table data structure (step 1610). The ISR then transmits the data using the identified route and updates the last used field accordingly (step 1612), with the operation ending thereafter.

Using this operation, direct or indirect routes may be selected based on a relative priority of the routes that may be defined by a user, automatically set based on detected conditions of the routes, or the like. By using a separate priority table data structure that is linked to a supernode routing table data structure, the supernode routing table data structure may remain relatively unchanged, other than the updates to the last used field bits, while changes to the priority table data structure may be made regularly based on changes in conditions of the routes, user desires, or the like.

Figure 17:
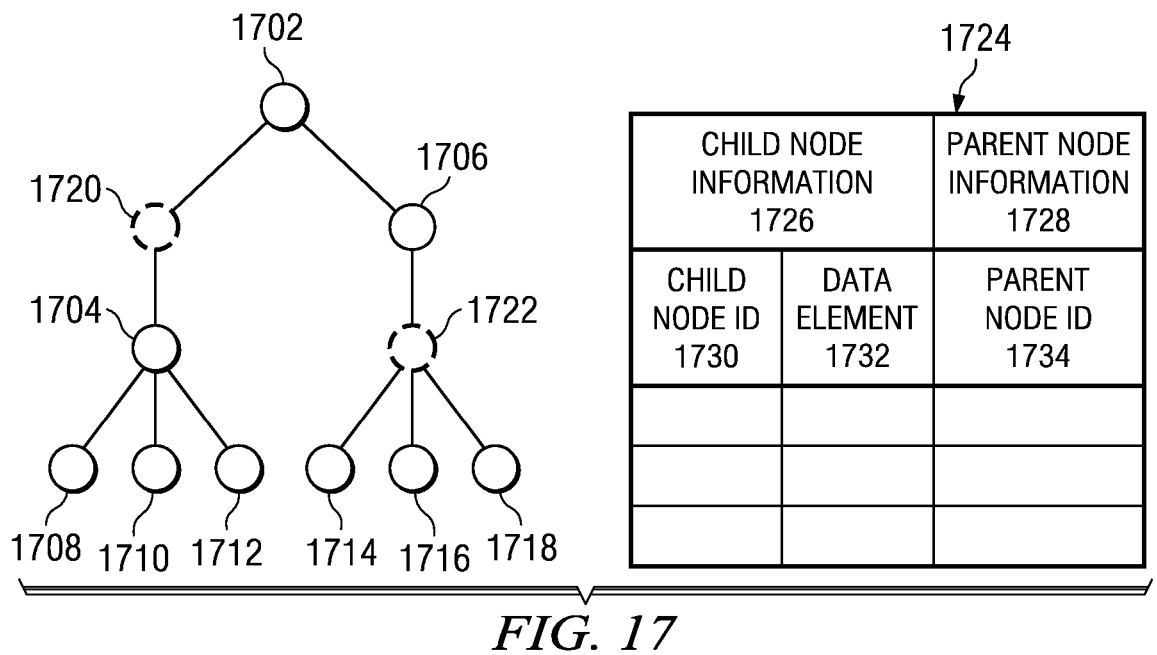
FIG. 17 is an exemplary diagram illustrating mechanisms for supporting collective operations in a multi-tiered full-graph interconnect architecture in accordance with one illustrative embodiment.

With the architecture and routing mechanism of the illustrative embodiments, the processing of various types of operations by the processor chips of the multi-tiered full-graph interconnect architecture may be facilitated. For example, the mechanisms of the illustrative embodiments facilitate the processing of collective operations within such a MTFG interconnect architecture. FIG. 17 is an exemplary diagram illustrating mechanisms for supporting collective operations in a multi-tiered full-graph interconnect architecture in accordance with one illustrative embodiment. A collective operation is an operation that requires a subset of all processes participating in a parallel job to wait for a result whose value depends on one or more input values provided by each of the participating processes. Typically, collectives are implemented by all processes within a communicator group calling the same collective communication function with matching arguments. Essentially, a collective operation is an operation that is performed on each member of a collective, e.g., each processor chip in a collective of processor chips, using the same controls, i.e. arguments.

The collective operations performed in the multi-tiered full-graph (MTFG) interconnect architecture of the illustrative embodiments are controlled by a collective acceleration unit (CAU), such as CAU 344 of FIG. 3. The CAU controls the implementation of the collective operations (collectives), which may encompass a wide range of possible operations. Some exemplary operations include reduce, multicast, all-to-one, barrier, all-reduce (which is a combination of reduce and multicast), or the like. Each of the operations may include operands that will be processed by nodes or processor chips, such as processor chips 402 of FIG. 4A, throughout the MTFG network, such as MTFG interconnect architecture network 412 of FIG. 4B. Exemplary operands may be add, min, max, minloc, maxloc, no-op, or the like. Minloc and maxloc operations identify not only the minimum or maximum of a set of values, but also which task supplied that value. The no-op operation implements the simplest collective operation commonly known as a barrier, which only requires that all the participating processes have arrived at it before any one process can consider it completed. While one node, or processor chip, in a MTFG interconnect architecture network may be able to execute the collective operation by itself, to increase performance, the CAU selects a number of nodes/processor chips that will each execute portions of the collective operation, thereby decreasing the time it would take to complete the execution of the collective operation. The selected nodes are arranged in the form of a tree, such that each node in the tree combines (or reduces) the operands coming from its children and sends onward the combined (or reduced) intermediate result.

Referring to FIG. 17, nodes 1702-1722 may be processors chips such as processor chip 300 of FIG. 3. Each of nodes 1702-1722 may reside within processor books and supernodes within a MTFG interconnect architecture, such as processor book 404, supernode 408, and MTFG interconnect architecture network 412 of FIG. 4B. Thus, the routing of collective operations between nodes 1702-1722 may be performed in accordance with the routing mechanisms described herein above, such as with reference to FIGS. 5, 6, 11A, 11B, and 12, for example. Further, nodes 1702-1722 may be nodes within the same processor book or may be nodes within different processor books. If particular ones of nodes 1702-1722 are within different processor books, the processor books may be within the same supernode or the processor books may reside within different supernodes.

To perform a multicast operation, the originating node may send the message to be multicast to the CAU on node 1702, for example, which may also be referred to as a parent node. The CAU on node 1702 may further send the message to the CAUs associated with nodes 1704 and 1706, which may also be referred to as sub-parent nodes. Because of how the collective tree is organized in FIG. 17, the CAUs on nodes 1704 and 1706 may further send the message to the CAUs on nodes 1708-1718, which may also be referred to as child nodes. The CAUs on nodes 1708-1718 may send the message to the final destination node that awaits the multicast message.

As another example, consider a reduction operation that needs to be performed by a set of nodes. Let nodes 1708-1718 desire to perform a reduction operation, such as a min operation. Each of nodes 1708-1718 transmits its value (that needs to be reduced) to the CAU on the corresponding node. Those CAUs then send the value onward to their parent CAU in the collective tree. In the case of the CAUs on nodes 1708-1712, the parent CAU resides on node 1704. As the values from the CAUs on nodes 1708-1712 arrive at the CAU on node 1704, the CAU on node 1704 performs the reduction operation. When all the children's values have been reduced, the CAU on node 1704 sends the operand to the CAU on node 1702. Similarly, the CAU on node 1706 sends the reduced value from the CAUs on nodes 1714-1718 on to the CAU on node 1702. At the CAU on node 1702, the two values from the CAUs on nodes 1704 and 1706 are reduced and the minimum value picked (since this example considers the min reduction operation). The minimum value is then multicast back through the collective tree to the children nodes 1708-1718.

Nodes 1720 and 1722 were not originally selected by the CAU to execute a portion of the collective operation. However, nodes 1720 and 1722 are within the route of information being passed between node 1702 and nodes 1704-1718. Thus, nodes 1720 and 1722 are shown as intermediate nodes and are only used for passing information but do not perform any portion of the collective operation. In order for nodes 1702-1706 to keep track of any lower or child node performing another portion of the collective operation and the parent node information, each of nodes 1702-1706 may implement table data structure 1724. Table data structure 1724 includes child node information 1726 and parent node information 1728. Table data structure 1724 includes child node identifier (ID) 1730 and data element 1732 for each child node that it is the parent node to. As each child node completes its portion of the collective operation and transmits the result to its parent node, the parent node updates data element 1732 as receiving the result. When all child nodes listed in child node identifier 1730 have their associated data element 1732 updated, then the parent node transmits its result and the results of the child nodes to its parent node which is listing in parent node identifier (ID) 1734 of parent node information 1728.

For example, node 1704 may have nodes 1708-1712 listed in child node identifier 1730 and node 1702 listed in parent node identifier 1734. As another example, node 1702 may have nodes 1704 and 1706 listed in child node identifier 1730. However, node 1702 being the main parent may either list node 1702 in parent node identifier 1734 or not have any node identifier listed in parent node identifier 1734. In order to improve the failure characteristics of the system, CAUs may be chosen to only reside on those nodes that have tasks participating in the communicating parallel job. This eliminates the possibility of a communicating parallel job being affected by the failure of a node outside the set of nodes on which the tasks associated with the communicating parallel job are executing.

Space considerations for the storage of data element 1732 may limit the number of children that a particular parent node can have. Alternatively, a parent node may have a larger number of children nodes by providing only one data element, into which all incoming children values are reduced.

The decision as to whether a particular collective operation should be done in the CAU or in the processor chip is left to the implementation. It is possible for an implementation to use exclusively software to perform the collective operation, in which case the collective tree is constructed and maintained in software. Alternatively, the collective operation may be performed exclusively in hardware, in which case parent and children nodes in the collective tree (distributed through the system in tables 1724) are made up of CAUs. Finally, the collective operation may be performed by a combination of hardware and software. Operations may be performed in hardware up to a certain height in the collective tree and be performed in software afterwards. The operation may be performed in software as the collective operation is performed, but hardware may be used to multicast the result back to the participating nodes.

Figure 18:
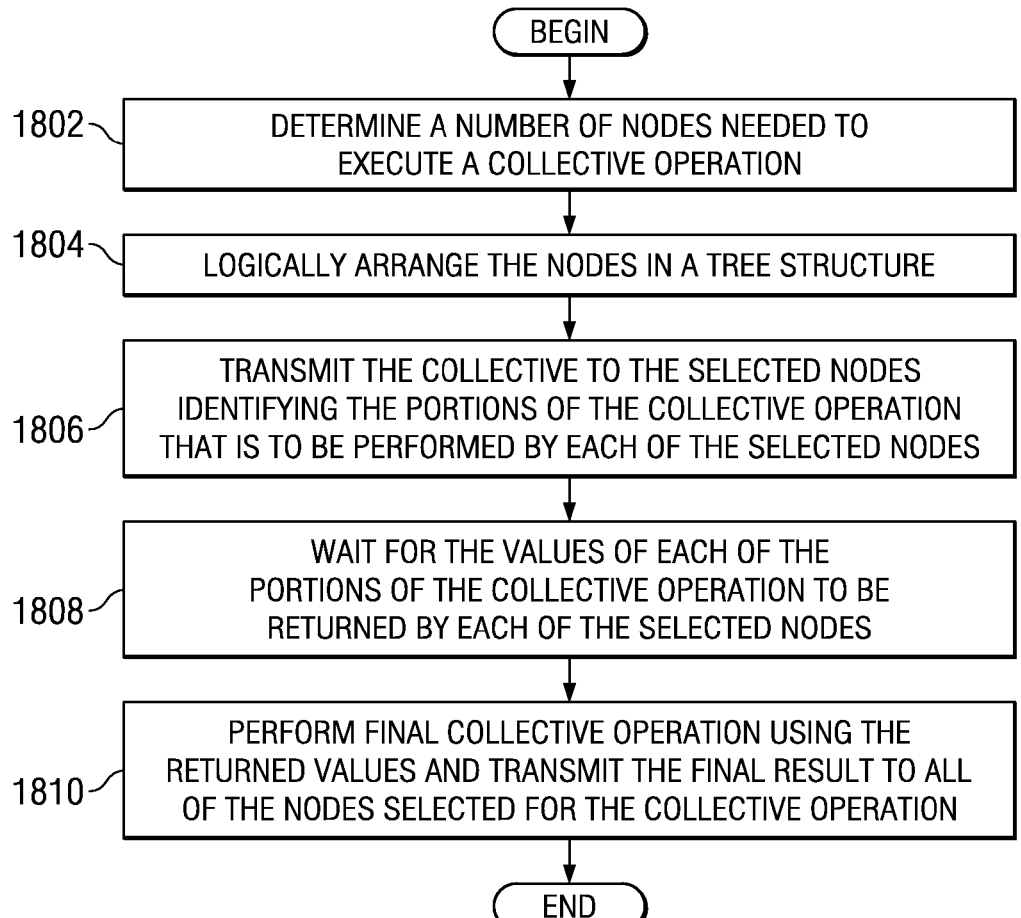
FIG. 18 depicts a flow diagram of the operation performed in supporting collective operations in a multi-tiered full-graph interconnect architecture in accordance with one illustrative embodiment.

FIG. 18 depicts a flow diagram of the operation performed in supporting collective operations in a multi-tiered full-graph interconnect architecture in accordance with one illustrative embodiment. As the operation begins, a collective acceleration unit (CAU), such as CAU 344 of FIG. 3, determines a number of nodes that will be needed to execute a particular collective operation (step 1802). The CAU logically arranges the nodes in a tree structure in order to determine subparent and/or child nodes (step 1804). The CAU transmits the collective operation to the selected nodes identifying the portions of the collective operation that is to be performed by each of the selected nodes (step 1806). The CAU then waits for each of the selected nodes to complete the respective portions of the collective operation and return their value to the CAU (step 1808). Once the CAU receives all of the values from the selected nodes, the CAU performs the final collective operation and returns the final result to all of the nodes that were involved in the collective operation (step 1810), with the operation terminating thereafter.

Thus, all of the tables and node selection may be performed in hardware, which will perform the setup and execution, or setup may be performed in software and then hardware, software, or a combination of hardware and software may execute the collective operations. Therefore, with the architecture and routing mechanism of the illustrative embodiments, collective operations may be performed by the processor chips of the multi-tiered full-graph interconnect architecture.

Figure 19:
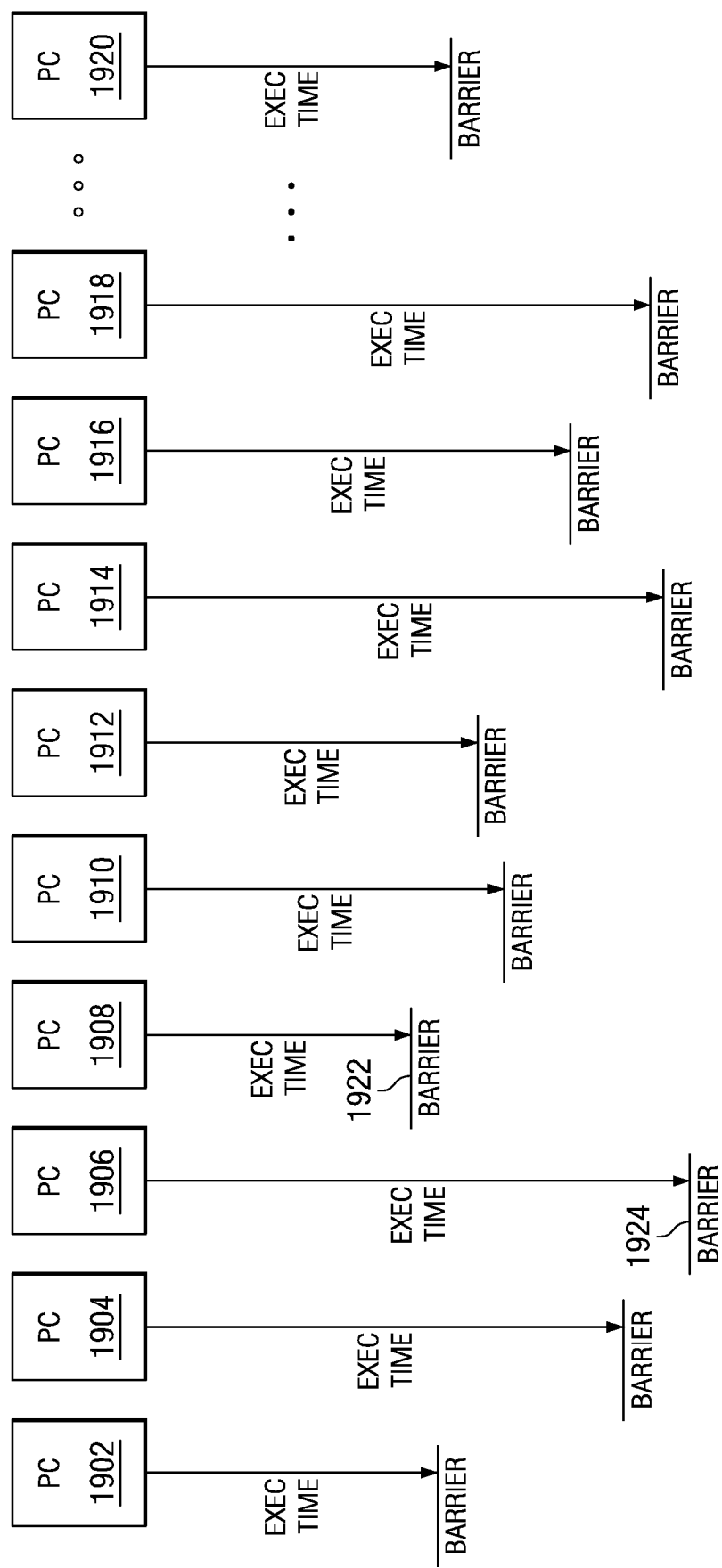
FIG. 19 is an exemplary diagram illustrating the use of the mechanisms of the illustrative embodiments to provide a high-speed message passing interface (MPI) for barrier operations in a multi-tiered full-graph interconnect architecture in accordance with one illustrative embodiment.

The mechanisms of the illustrative embodiments may be used in a number of different program execution environments including message passing interface (MPI) based program execution environments. FIG. 19 is an exemplary diagram illustrating the use of the mechanisms of the illustrative embodiments to provide a high-speed message passing interface (MPI) for barrier operations in a multi-tiered full-graph interconnect architecture in accordance with one illustrative embodiment. As is generally known in the art, when performing MPI jobs, which typically require a cluster or group of processor chips to perform either the same operation on different data in parallel, or different operations on the same data in parallel, it is necessary that the individual tasks being performed by the processor chips be synchronized. This is typically done by calling a synchronization operation, referred to in the art as a MPI barrier operation. In utilizing a MPI barrier operation, when a processor chip completes its computation on a portion of data, it makes a call to a MPI barrier operation. When each of the processor chips in a cluster or group make the call to the MPI barrier operation, a MPI controller in each of the processor chips determines that the next cycle of MPI tasks may commence. In making the call to the MPI barrier operation, a timestamp for a particular processor chip's call of the MPI barrier operation is communicated to the other processor chips indicating that the barrier has been reached. Once each processor chip receives the barrier signals from all of the other processor chips then the processor chips know that each of the other processor chips has completed its MPI task and the timestamp of when each processor chip completed its respective MPI task.

In order to make the most effective use of system resources, it is advantageous to ensure that the system processors use the available system resources in the most effective manner possible to perform parallel computation. In order to do this, the illustrative embodiment takes advantage of the MPI barrier operation. In implementing the MPI barrier operation, the processors typically arrive at MPI barrier operations at different times. As with the nodes in FIG. 17, processor chips 1902-1920 may be provided in a MTFG interconnect architecture such as depicted in FIGS. 4A and 4B. Thus, processor chips 1902-1920 may be provided in the same or different processor books. If particular ones of processor chips 1902-1920 are within different processor books, the processor books may be within the same supernode or the processor books may reside within different supernodes.

After commencing execution or after completing a previous barrier operation, for example, processor chips 1902-1920 in FIG. 19 execute a MPI barrier operation, arriving at the barrier at different times. For instance, processor chip 1906 arrives at the barrier at time instance 1924, while processor chip 1908 arrives early at the barrier at time instance 1922.

In this illustrative embodiment, as processor chips 1902-1920 arrive at a barrier, processor chips 1902-1920 transmit an arrival signal to a particular host fabric interface, such as HFI 338 of FIG. 3, which is called the root HFI. As the root HFI receives the arrival signals from processor chips 1902-1920, the root HFI saves the arrival signals for processing. After the last arrival signal is received, the root HFI processes the arrival information. The root HFI itself may process the arrival information or a software program executing on the same processor chip as the root HFI may process the arrival information on behalf of the root HFI.

The root HFI may then direct system resources from those processor chips that arrived early at the barrier, such as processor chip 1908, to those processor chips that arrived late at the barrier, such as processor chip 1906. Power and thermal dissipation capacity are examples of two such resources.

In the case of power, the root HFI (or a software agent executing on its behalf) directs those processor chips that arrived early at the barrier to reduce their power consumption and arrive at the barrier at a later time. Those processor chips that arrived late at the barrier are permitted to use more power, so as to compute faster and arrive at the barrier earlier. In this manner, the total system power consumption is kept substantially constant, while the barrier arrival time, which is the time when all the tasks have arrived at the barrier, is shortened.

In the case of thermal capacity, the root HFI may direct those processor chips that arrived early at the barrier to reduce their heat dissipation by executing at a lower voltage or frequency. Executing at a lower voltage or frequency causes the processor chips to arrive at the barrier at a later time, while reducing heat dissipation. Those processor chips that arrived late at the barrier are permitted to dissipate more thermal energy, so as to execute with a higher voltage and/or frequency and arrive at the barrier earlier. In this manner, the total system thermal dissipation is kept substantially constant, while the barrier arrival time (the time when all the tasks have arrived at the barrier) is shortened.

In a similar manner, the root HFI may direct the re-apportionment of the memory bandwidth, the cache capacity, the cache bandwidth, the number of cache sets available to each task executing on a chip (i.e., the cache associativity), the simultaneous multithreading (SMT) thread priority, microarchitectural features such as the number of physical registers available for register renaming, the bus bandwidth, number of functional units, number of translation lookaside buffer (TLB) entries and other translation resources, or the like. In addition, depending on the granularity with which system resources can be re-apportioned, the root HFI may change the mapping of tasks to processor chips. For example, the root HFI may take tasks from the slowest processor chip and reassign those tasks to the fastest processor chip.

Since a processor chip may have a multitude of tasks executing on it, the root HFI may direct the partitioning of the above mentioned system resources such that the tasks executing on the processor chip arrive at the barrier at as close to the same time as possible. Similarly, the root HFI may cause the task to processor chip mapping to be changed, so that each processor chip is performing the same amount of work.

Since the relationship between the amount of the above mentioned resources and the system performance is often non linear, the root HFI may employ a feedback-driven mechanism to ensure that the resource partitioning is done to minimize the barrier arrival time. Furthermore, the tasks may be executing multiple barriers (one after the other). For instance, this may arise due to code executing a sequence of barriers within a loop. Since the tasks may have different barrier arrival times and different arrival sequences for different barriers, the root HFI may also perform the above resource partitioning for each barrier executed by the program. The root HFI may distinguish between multiple barriers by leveraging program counter information and/or barrier sequence numbers that is supplied by the tasks as they arrive at a barrier.

Finally, the root HFI may also leverage compiler analysis done on the program being executed that tags the barriers with other information such as the values of key control and data variables. Tagging the barriers may ensure that the root HFI is able to distinguish between different classes of computation preceding the same barrier.

Figures 20, 22:
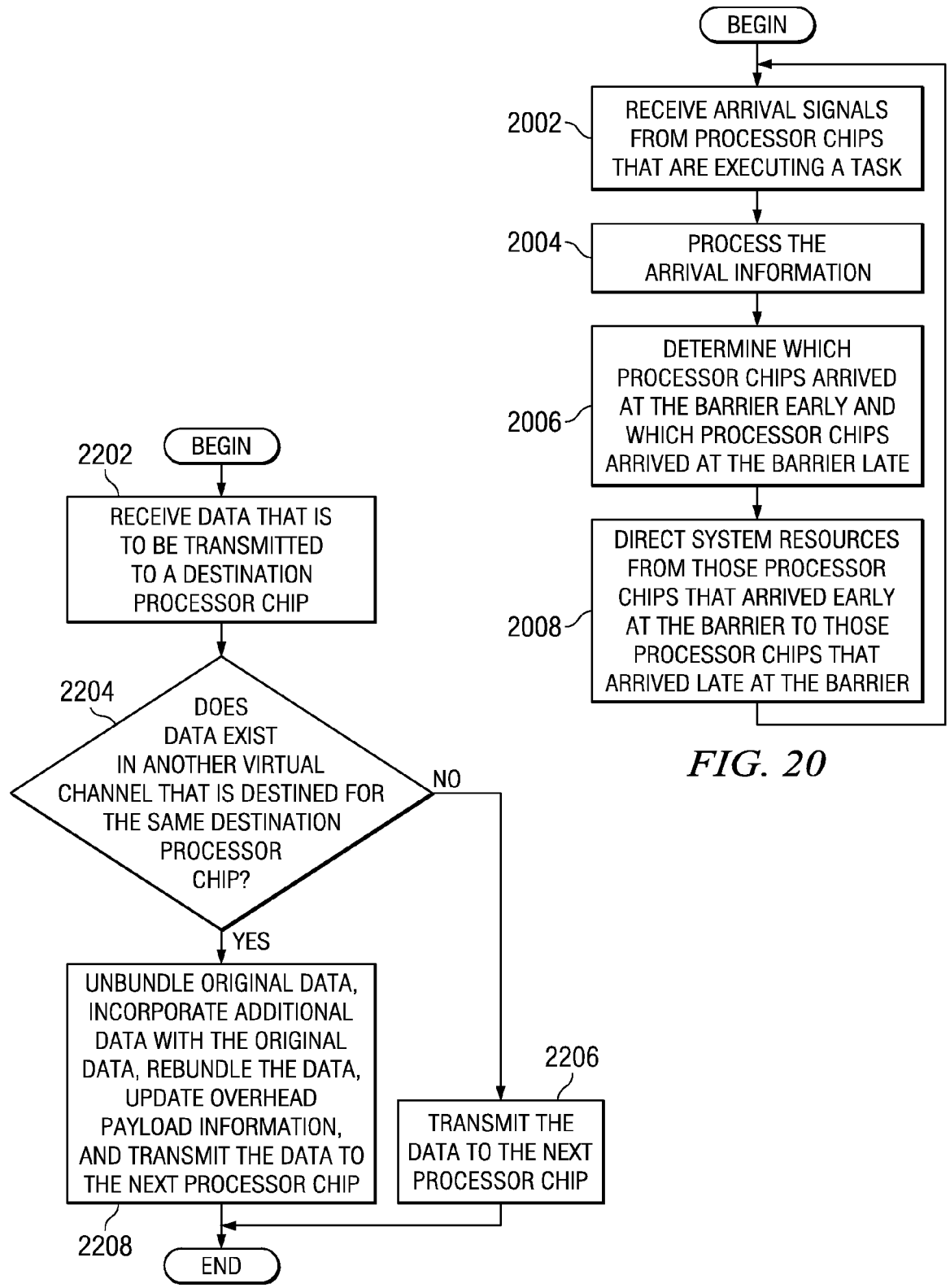
FIG. 20 depicts a flow diagram of the operation performed in providing a high-speed message passing interface (MPI) for barrier operations in a multi-tiered full-graph interconnect architecture in accordance with one illustrative embodiment.
FIG. 22 depicts a flow diagram of the operation performed in coalescing data packets in virtual channels of a data processing system in a multi-tiered full-graph interconnect architecture in accordance with one illustrative embodiment.

FIG. 20 depicts a flow diagram of the operation performed in providing a high-speed message passing interface (MPI) for barrier operations in a multi-tiered full-graph interconnect architecture in accordance with one illustrative embodiment. As the operation begins, a particular host fabric interface (HFI), such as HFI 338 of FIG. 3, receives arrival signals from processor chips that are executing a task (step 2002). The arrival signals are transmitted by each of the processor chips as each of the processor chips arrive at the barrier. Once the HFI receives all of the arrival signals from the processor chips that are executing the task, the HFI (or a software agent executing on its behalf) processes the arrival information (step 2004). In processing the arrival information, the HFI determines which processor chips arrived at the barrier early and which processor chips arrived at the barrier late (step 2006). Using the determined information, the HFI may direct system resources from those processor chips that arrived early at the barrier to those processor chips that arrived late at the barrier (step 2008), with the operation returning to step 2002. The HFI may then continue to collect arrival information on the next task executed by the processor chips and divert system resources in order for the processor chips to arrive at the barrier at or approximately close to the same time.

Thus, the architecture and routing mechanisms previously described above may be used to facilitate the sending of these MPI barrier operations in order to inform and synchronize the other processor chips of the completion of the task. The benefits of the architecture and routing mechanisms previously described above may thus be achieved in a MPI based program execution using the illustrative embodiments.

As discussed above, each port in a processor chip may support multiple virtual channels (VCs) for storing information/data packets, to be communicated via the various pathways of the MTFG interconnect architecture. Typically, information/data packets are placed in a VC corresponding to the processor chip's position within the pathway between the source processor chip and the destination processor chip, i.e. based on which hop in the pathway the processor chip is associated with. However, a further mechanism of the illustrative embodiments allows data to be coalesced into the same VC when the data is destined for the same ultimate destination processor chip. In this way, data originating with one processor chip may be coalesced with data originating from another processor chip as long as they have a common destination processor chip.

Figure 21:
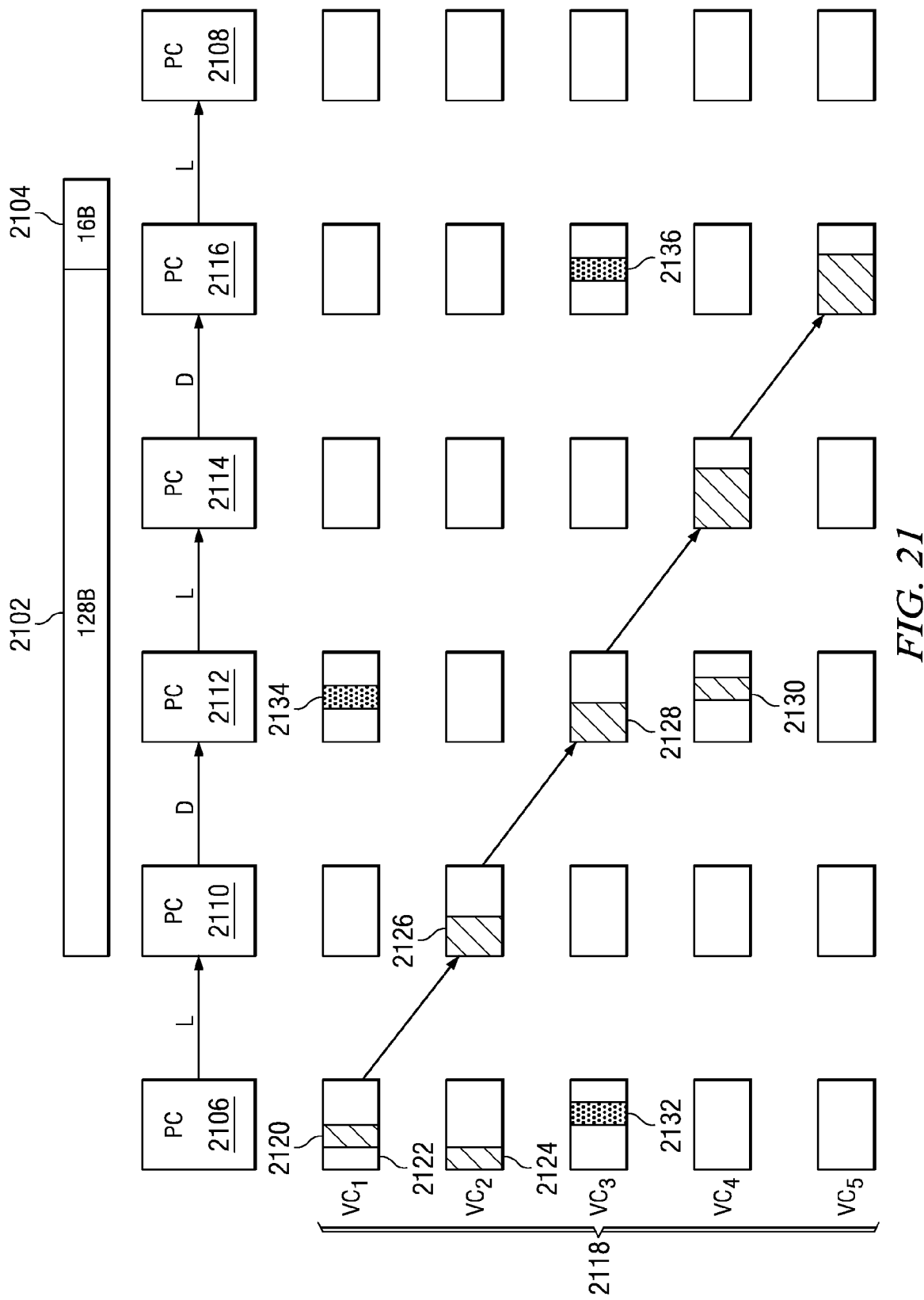
FIG. 21 is an exemplary diagram illustrating the use of the mechanisms of the illustrative embodiments to coalesce data packets in virtual channels of a data processing system in a multi-tiered full-graph interconnect architecture in accordance with one illustrative embodiment.

FIG. 21 is an exemplary diagram illustrating the use of the mechanisms of the illustrative embodiments to coalesce data packets in virtual channels of a data processing system in a multi-tiered full-graph interconnect architecture in accordance with one illustrative embodiment. In a multi-tiered full-graph (MTFG) interconnect architecture, each of the data packets sent through the network may include both a fixed packet datagram 2102 for the payload data and overhead data 2104. For example, a data packet may be comprised of 128 bytes of payload data and 16 bytes of overhead data, such as header information or the like.

When a data packet is sent, for example, from processor chips 2106 to processor chip 2108 through processor chips 2110-2116, the integrated switch/router (ISR), such as ISR 340 of FIG. 3, may package all small blocks of information from any of virtual channels 2118 for processor chips 2106-2116 that are headed to processor chip 2108 together without regard to the different classes of virtual channels, thereby increasing efficiency. That is, if a block of data is comprised of 8 bytes of payload data and 1 byte of overhead data, this block may be combined with other blocks of similar small size to make up a larger portion of the 128 bytes and 16 bytes of a typical data packet. Thus, rather than sending more data packets with less payload data, a smaller number of data packets may be sent with larger payload data sizes. Of course, these individual data packets must be coalesced at one end of the transmission and dismantled at the other end of the transmission.

For example, when an ISR associated with processor chip 2106 transmits a packet that is routed from processor chip 2106 to processor chip 2108, the ISR first picks data block 2120 in virtual channel 2122, as the data in virtual channel 2122 is the initial data that is being transmitted to processor chip 2108. Prior to bundling the data to be sent to processor chip 2108, the ISR determines if there is data within the other virtual channels 2118 associated with processor chip 2106 that also needs to be routed to for processor chip 2108. If there is additional data, such as data block 2124, then the ISR bundles data block 2120 and data block 2122 together, updates overhead data 2104 with information regarding the additional payload, and transmits the bundled data to processor chip 2110. The ISR in processor chip 2110 stores the bundled data in virtual channel 2126. The ISR in processor chip 2110 determines if there is data within any of virtual channels 2118 associated with processor chip 2110 that is also destined for processor chip 2108. Since, in this example, there is no additional data to be included, the ISR of processor chip 2110 transmits the bundled data to processor chip 2112.

The ISR in processor chip 2112 stores the bundled data in virtual channels 2128. The ISR in processor chip 2112 then determines if there is data within any of virtual channels 2118 associated with processor chip 2112 that is also destined for processor chip 2108. Since, in this example, data block 2130 is to be included, the ISR of processor chip 2112 unbundles the bundled data, incorporates data block 2130, rebundles the data, updates overhead data 2104 with information regarding the additional payload, and transmits the rebundled data to processor chip 2114. The same operation is performed from processor chips 2114 and 2116 where the ISR of the associated processor chip may continue to transmit the bundled data to the next processor chip in the path if there is no additional data to be included in the bundled data or unbundle and rebundle the bundled data if there is additional data to be included. Data blocks 2132-2136 are not bundled with the packet going to processor chip 2108, since data blocks 2132-2136 do not have the same destination address of processor chip 2108 as data blocks 2120, 2124, and 2130. Once the bundled data arrives at processor chip 2108, the ISR associated with processor chip 2108 unbundles the data according to overhead data 2104 and processes the information accordingly.

FIG. 22 depicts a flow diagram of the operation performed in coalescing data packets in virtual channels of a data processing system in a multi-tiered full-graph interconnect architecture in accordance with one illustrative embodiment. The operation described in FIG. 22 is performed by each integrated switch/router (ISR), such as ISR 340 of FIG. 3, along a route from a source processor chip up to the destination processor chip. As the operation begins, the ISR within a processor chip receives data that is to be transmitted to a destination processor chip (step 2202). The ISR determines if there is data within other virtual channels associated with the processor chip that is also destined for the same destination processor chip (step 2204). Note that the destination processor chip being discussed here pertains to the processor chip to which the ISR is directly connected over one link. If at step 2204 there is no additional data, then the ISR transmits the bundled data to the next processor chip (step 2206).

If at step 2204 there is additional data, then the ISR unbundles the original data block, incorporates the data block(s) from the other virtual channel(s), rebundles the data together, updates the overhead data with information regarding the additional payload, and transmits the bundled data to the next processor chip along the route (step 2208), with the operation ending thereafter. As stated earlier, this operation is performed by each ISR on each processor chip along a route from a source processor chip up to the destination processor chip. The destination processor chip unbundles the data according to the overhead data and processes the information accordingly.

Thus, the illustrative embodiments allow data to be coalesced into the same VC when the data is destined for the same ultimate destination processor chip. In this way, data originating with one processor chip may be coalesced with data originating from another processor chip as long as they have a common destination processor chip. Thus, bundling the small data blocks from the various virtual channels within the MTFG interconnect architecture increases efficiency and clears the virtual channels for future data.

Thus, the illustrative embodiments provide a highly-configurable, scalable system that integrates computing, storage, networking, and software. The illustrative embodiments provide for a multi-tiered full-graph interconnect architecture that improves communication performance for parallel or distributed programs and improves the productivity of the programmer and system. With such an architecture, and the additional mechanisms of the illustrative embodiments described herein, a multi-tiered full-graph interconnect architecture is provided in which maximum bandwidth is provided to each of the processors or nodes such that enhanced performance of parallel or distributed programs is achieved.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, of routing information through the data processing system, the data processing system comprising a plurality of supernodes, the plurality of supernodes comprising a plurality of processor hooks, and the plurality of processor books comprising a plurality of processors, the method comprising:
   receiving data at a source processor within a set of processors that is to he transmitted to a destination processor, wherein the data includes address information;
   performing a first determination as to whether the destination processor is within a same processor book as the source processor based on the address information;
   performing a second determination as to whether the destination processor is within a same supernode as the source processor based on the address information if the destination processor is not within the same processor book;
   identifying a routing path for the data based on results of the first determination, the second determination, and one or more routing table data structures; and
   transmitting the data from the source processor along the identified routing path toward the destination processor.

2. The method of claim 1, wherein:
   the address information comprises a processor book identifier and a supernode identifier of the destination processor;
   performing the first determination comprises comparing the processor hook identifier in the address information with a processor book identifier associated with the source processor; and
   the destination processor is determined to he within a same processor hook as the source processor if the processor book identifier associated with the source processor matches the processor book identifier in the address information.

3. The method of claim 2, wherein:
performing the second determination comprises comparing the supernode identifier in the address information with a supernode identifier associated with the source processor; and
the destination processor is determined to be within a same supernode as the source processor if the supernode identifier associated with the source processor matches the supernode identifier in the address information.

4. The method of claim 1, wherein identifying the routing path for the data based on results of the first determination, the second determination, and one or more routing table data structures comprises:
performing a lookup operation of a processor chip identifier in the address information in a processor chip routing table data structure if results of the first determination indicate that the destination processor is within a same processor hook as the source processor.

5. The method of claim 4, wherein. a result of the lookup operation of the processor chip identifier is a path within the same processor book from the source processor to the destination processor.

6. The method of claim 1, wherein identifying the muting path for the data based on results of the first determination, the second determination, and one or more routing table data structures comprises:
performing a lookup operation of a processor book identifier in the address information in a processor book routing table data structure if results of the first determination indicate that the destination processor is not within a same processor book as the source processor and the second determination indicates that the destination processor is within a same supernode as the source processor.

7. The method of claim 6, wherein a result of the lookup operation of the processor book identifier is a path within the same supernode from the source processor to a processor in a processor hook in which the destination processor is provided.

8. The method of claim 1, wherein identifying the routing path for the data based on results of the first determination, the second determination, and one or more routing table data structures comprises;
performing a lookup operation of the supernode identifier in the address information in a supernode routing table data structure if results of the first determination indicate that the destination processor is not within a same processor book as the source processor and the second determination indicates that the destination processor is not within a same supernode as the source processor.

9. The method of claim 8, wherein a result of the lookup operation of the supernode identifier is a path between supernodes from the source processor to a processor in another supernode in the data processing system, 10. The method of claim 9, wherein the path from the source processor to a processor in another supernode is a direct path, and wherein the another supernode is a supernode in which the destination processor is provided, 11. The method of claim 9, wherein the path from the source processor to a processor in another supernode is an indirect path, and wherein the another supernode is an intermediary supernode in which the destination processor is not provided.

12. The method of claim 1, wherein the one or more routing table data structures comprises a processor chip routing table data structure, a processor book routing table data structure, and a supernode routing table data structure, and wherein each processor within the set of processors has each of the one or more routing table data structures.

13. A computer program product, for routing information through a data processing system, comprising a non-transitory computer useable medium having a computer readable program, wherein the computer readable program, when executed in a source processor in the data processing system, causes the source processor to:
receive data at the source processor within a set of processors that is to be transmitted to a destination processor, wherein the data includes address information;
perform a first determination as to whether the destination processor is within a same processor book as the source processor based on the address information;
perform a second determination as to whether the destination processor is within a same supernode as the source processor based on the address information if the destination processor is not within the same processor book;
identify a routing path for the data based on results of the first determination, the second determination, and one or more routing table data structures; and
transmit the data from the source processor along the identified routing path toward the destination processor, wherein the data processing system comprises a plurality of supernodes, the plurality of supernodes comprising a plurality of processor books, and the plurality of processor books comprising a plurality of processors.

14. The computer program product of claim 13, wherein the address information comprises a processor book identifier and a supernode identifier of the destination processor, wherein the computer readable program to performing the first determination further comprises computer readable program that causes the data processing system to compare the processor book identifier in the address information with a processor book identifier associated with the source processor, and wherein the destination processor is determined to be within a same processor book as the source processor if the processor book identifier associated with the source processor matches the processor book identifier in the address information.

15. The computer program product of claim 14, wherein the computer readable program to perform the second determination further comprises computer readable program that causes the data processing system to compare the supernode identifier in the address information with a supernode identifier associated with the source processor, and wherein the destination processor is determined to be within a same supernode as the source processor if the supernode identifier associated with the source processor matches the supernode identifier in the address information.

16. The computer program product of claim 13, wherein identifying the routing path for the data based on results of the first determination, the second determination, and one or more routing table data structures further comprises the computer readable program causing the data processing system to perform at least one of:
a lookup operation of a processor chip identifier in the address information in a processor chip routing table data structure if results of the first determination indicate that the destination processor is within a same processor book as the source processor;
a lookup operation of a processor hook identifier in the address information in a processor book routing table data structure if results of the first determination indicate that the destination processor is not within a same processor book as the source processor and the second determination indicates that the destination processor is within a same supernode as the source processor; or a lookup operation of the supernode identifier in the address information in a supernode routing table data structure if results of the first determination indicate that the destination processor is not within a same processor hook as the source processor and the second determination indicates that the destination processor is not within a same supernode as the source processor.

17. A data processing system for routing information comprising;

a source processor; and a memory coupled to the source processor, wherein the memory comprises instructions which, when executed by the source processor, cause the source processor to:

receive data at the source processor within a set of processors that is to be transmitted to a destination processor, wherein the data includes address information;

perform a first determination as to whether the destination processor is within a same processor book as the source processor based on the address information;

perform a second determination as to whether the destination processor is within a same supernode as the source processor based on the address information if the destination processor is not within the same processor book;

identify a routing path for the data based on results of the first determination, the second determination, and one or more routing table data structures; and transmit the data from the source processor along the identified routing path toward the destination processor, wherein the data processing system comprises a plurality of supernodes, the plurality of supernodes comprising a plurality of processor books, and the plurality of processor books comprising a plurality of processors.

18. The data processing system of claim 17, wherein the address information comprises a processor book identifier and a supernode identifier of the destination processor, wherein the instruction to perform the first determination comprises further instructions that cause the processor to compare the processor book identifier in the address information with a processor hook identifier associated with the source processor, and wherein the destination processor is determined to be within a same processor book as the source processor if the processor book identifier associated with the source processor matches the processor book identifier in the address information.

19. The data processing system of claim 18, wherein the instruction to perform the second determination comprises further instructions that cause the processor to compare the supernode identifier in the address information with a supernode identifier associated with the source processor, and wherein the destination processor is determined to be within a same supernode as the source processor if the supernode identifier associated with the source processor matches the supernode identifier in the address information.

20. The data processing system of claim 17, wherein the instruction to identify the routing path for the data based on results of the first determination, the second determination, and one or more routing table data structures comprises further instructions that cause the processor to performing at least one of:

a lookup operation of a processor chip identifier in the address information in a processor chip routing table data structure if results of the first determination indicate that the destination processor is within a same processor book as the source processor;

a lookup operation of a processor book identifier in the address information in a processor book routing table data structure if results of the first determination indicate that the destination processor is not within a same processor book as the source processor and the second determination indicates that the destination processor is within a same supernode as the source processor; or a lookup operation of the supernode identifier in the address information in a supernode routing table data structure if results of the first determination indicate that the destination processor is not within a same processor hook as the source processor and the second determination indicates that the destination processor is not within a same supernode as the source processor.

* * * * *